United States Patent
Johnsen et al.

(10) Patent No.: US 12,297,692 B2
(45) Date of Patent: May 13, 2025

(54) BUILDING APERTURE COVER, SUCH AS A WINDOW OR DOOR, COMPRISING FLEXIBLE GASKET WITH SEALED CAVITY

(71) Applicant: VKR HOLDING A/S, Hørsholm (DK)

(72) Inventors: Simon Johnsen, Hørsholm (DK); Thomas Villiam Sejer Mikkelsen, Hørsholm (DK); Annette Johncock Krisko, Prarie du Sac, WI (US)

(73) Assignee: VKR HOLDING A/S, Horsholm (DK)

( * ) Notice: Subject to any disclaimer, the term of this patent is extended or adjusted under 35 U.S.C. 154(b) by 152 days.

(21) Appl. No.: 17/922,618

(22) PCT Filed: May 5, 2021

(86) PCT No.: PCT/EP2021/062149
§ 371 (c)(1),
(2) Date: Nov. 1, 2022

(87) PCT Pub. No.: WO2021/228713
PCT Pub. Date: Nov. 18, 2021

(65) Prior Publication Data
US 2023/0167675 A1    Jun. 1, 2023

(30) Foreign Application Priority Data

May 12, 2020   (DK) .............................. PA202070307

(51) Int. Cl.
*E06B 7/23*       (2006.01)
*E04D 13/03*   (2006.01)
(Continued)

(52) U.S. Cl.
CPC ............ *E06B 7/2318* (2013.01); *E04D 13/03* (2013.01); *E06B 3/6612* (2013.01);
(Continued)

(58) Field of Classification Search
CPC .. E06B 3/6612; E06B 3/6621; E06B 3/66333; E06B 7/2318; E06B 7/2303; E06B 7/2314; E04D 13/03
See application file for complete search history.

(56) References Cited

U.S. PATENT DOCUMENTS 2,934,801 A    5/1960   Blaszkowski
3,064,320 A *  11/1962  Blaszkowski ............ E06B 3/62
                                                        52/204.593

(Continued)

FOREIGN PATENT DOCUMENTS

| DE | 2255162 | 5/1974 |
|---|---|---|
| JP | 2002021437 A | 1/2002 |
| WO | 2014039642 A1 | 3/2014 |

OTHER PUBLICATIONS

Internaional Search Report for corresponding application PCT/EP2021/062149 filed May 7, 2021; Mail date Sep. 1, 2021.

(Continued)

*Primary Examiner* — Paola Agudelo
(74) *Attorney, Agent, or Firm* — CANTOR COLBURN LLP

(57) ABSTRACT

The present disclosure relates to a building aperture cover (1) such as a window or a door. The building aperture cover comprises a frame arrangement (2) and a vacuum insulated glass unit (3), wherein the vacuum insulated glass unit (3) comprises an evacuated gap (4) placed between a first and a second glass sheet (3a, 3b), and wherein a plurality of support structures (5) are arranged in the evacuated gap (4). The vacuum insulated glass unit (3) is arranged in the frame arrangement (2, 6). The building aperture cover (1) comprises one or more elongated flexible sealing gaskets (21, 22) arranged between an outer major surface (S1, S2) of the vacuum insulated glass unit (3) and a frame part (13a, 13c, 23a, 23c) of the frame arrangement (2, 6). The one or more (Continued)

Figure 1:
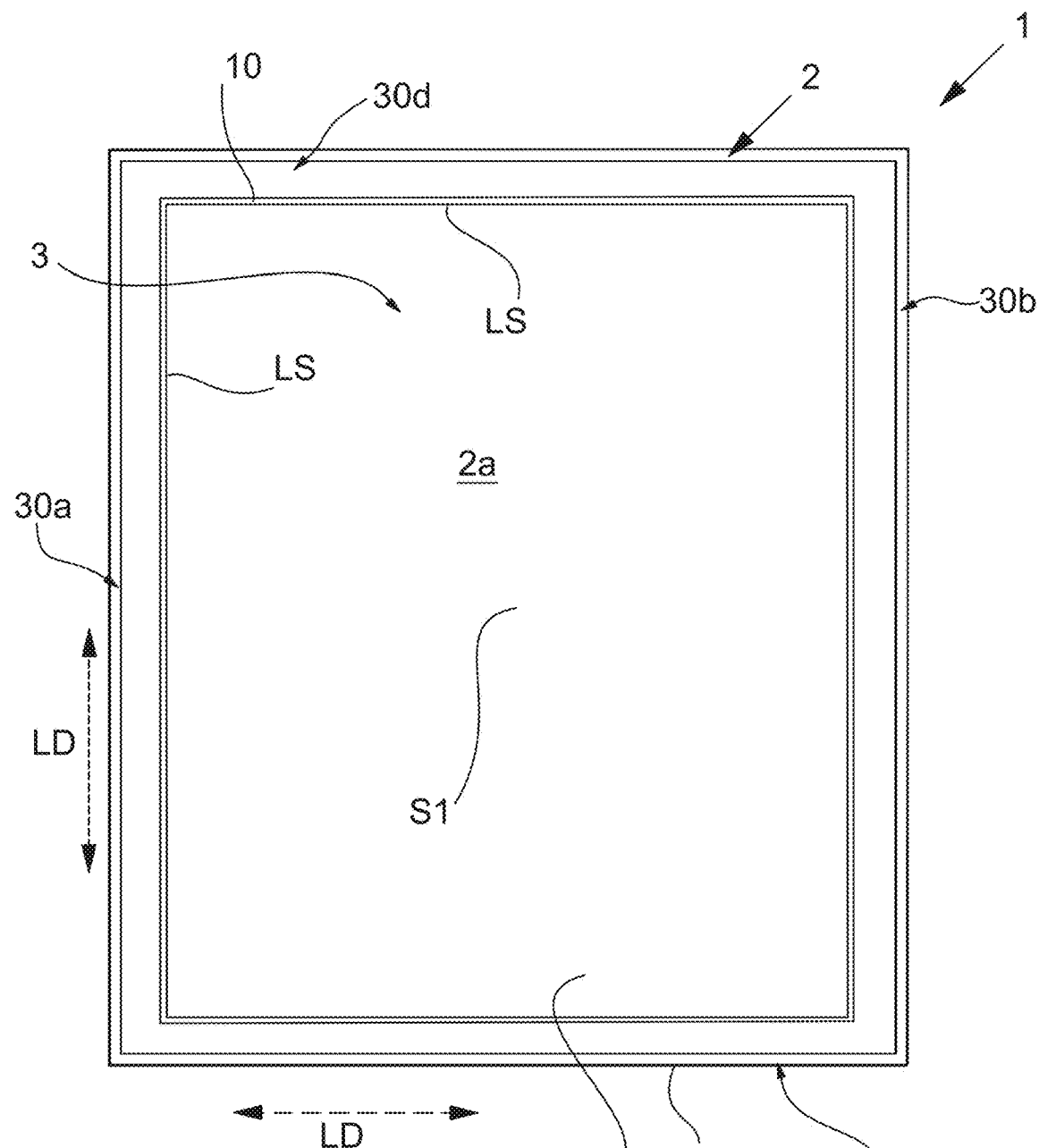

elongated flexible sealing gaskets (21, 22) is arranged to extend substantially parallel to an edge (7, 50a-50d) of the vacuum insulated glass unit (3). One or more of the one or more elongated flexible sealing gaskets (21, 22) comprises an interior, sealed cavity (21a, 22a) configured to comprise a pressurized fluid.

20 Claims, 13 Drawing Sheets

(51) Int. Cl.
*E06B 3/66* (2006.01)
*E06B 3/663* (2006.01)

(52) U.S. Cl.
CPC .......... *E06B 3/6621* (2013.01); *E06B 7/2303* (2013.01); *E06B 7/2314* (2013.01); *E06B 3/66333* (2013.01)

(56) References Cited

U.S. PATENT DOCUMENTS

| | | | |
|---|---|---|---|
| 3,807,100 A * | 4/1974 | Kuss | E04D 3/366 |
| | | | 52/762 |
| 6,435,630 B1 | 8/2002 | Anin | |
| 6,769,841 B2 * | 8/2004 | Moulin | E02D 5/14 |
| | | | 52/2.13 |
| 6,823,643 B2 * | 11/2004 | France | E06B 3/64 |
| | | | 52/786.13 |
| 9,447,627 B2 | 9/2016 | Thompson | |
| 11,285,703 B2 * | 3/2022 | Jørgensen | B32B 41/00 |
| 11,555,345 B2 * | 1/2023 | Hedeby | E06B 3/6612 |
| 2012/0007321 A1 * | 1/2012 | Davis | E06B 7/2303 |
| | | | 277/628 |
| 2014/0007396 A1 * | 1/2014 | Jones | E06B 3/585 |
| | | | 29/428 |
| 2014/0069034 A1 * | 3/2014 | Jones | E06B 3/585 |
| | | | 52/204.593 |
| 2014/0072735 A1 * | 3/2014 | Jones | E06B 3/6612 |
| | | | 428/34 |
| 2014/0230349 A1 * | 8/2014 | Rasmussen | E06B 7/2314 |
| | | | 52/200 |
| 2017/0002599 A1 * | 1/2017 | Thompson | E06B 3/5454 |
| 2019/0263992 A1 * | 8/2019 | Akahori | C08J 9/103 |
| 2020/0149345 A1 * | 5/2020 | Rottler | E06B 3/677 |
| 2020/0262750 A1 * | 8/2020 | Miki | C03C 27/08 |
| 2022/0090438 A1 * | 3/2022 | Takeuchi | E06B 3/6775 |
| 2022/0170313 A1 * | 6/2022 | Ishibashi | C03C 27/06 |
| 2023/0167675 A1 * | 6/2023 | Johnsen | E06B 3/6612 |
| | | | 52/173.3 |

OTHER PUBLICATIONS

Written Opinion of the International Searching Authority for corresponding application PCT/EP2021/062149 filed May 7, 2021; Mail date Sep. 1, 2021.

* cited by examiner

BUILDING APERTURE COVER, SUCH AS A WINDOW OR DOOR, COMPRISING FLEXIBLE GASKET WITH SEALED CAVITY

The present disclosure relates to a building aperture cover such as a window or a door, where the building aperture cover comprises a vacuum insulated glass (VIG) unit, and a method of retrofitting a building aperture cover to comprise a vacuum insulated glass unit.

BACKGROUND

Vacuum insulated glass (VIG) units provides several advantages such as good heat insulation properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. U.S. Pat. No. 9,447,627B2 discloses a window frame unit for a vacuum insulated glass unit. A base member and a glazing member of a frame provides a recess wherein a distal edge of a VIG unit is arranged. The recess is disclosed to be designed to accommodate distortion of the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit. U.S. Pat. No. 6,435,630B1 discloses other solutions for holding a VIG unit.

It however appears that problems still exists when arranging a VIG unit in a frame to provide a window or door for e.g. covering building apertures. The present disclosure provides a solution where a VIG unit is arranged in a frame of a building aperture cover, which may e.g. help to improve or ensure the lifetime, such as the estimated lifetime, of the VIG unit and/or the building aperture cover. Also or alternatively, it may help to provide an advantageous solution that may be used under varying climatic conditions.

SUMMARY

The present disclosure relates to a building aperture cover such as a window or a door, wherein said building aperture cover comprises a frame arrangement and a vacuum insulated glass unit. The vacuum insulated glass unit comprises an evacuated gap placed between a first and a second glass sheet, and a plurality of support structures are arranged in the evacuated gap, and the vacuum insulated glass unit is arranged in said frame arrangement. The building aperture cover comprises one or more elongated flexible sealing gaskets arranged between an outer major surface of the vacuum insulated glass unit and a frame part of the frame arrangement. The one or more elongated flexible sealing gaskets is arranged to extend substantially parallel to an edge of the vacuum insulated glass unit, and one or more of the one or more elongated flexible sealing gaskets comprises an interior, sealed cavity configured to comprise a pressurized fluid.

Vacuum insulated glass (VIG) units may be subjected to various movements caused by temperature differences between the first and second glass sheets of the VIG unit. This may cause movements of the VIG unit edges in various directions dependent on e.g. the type of edge seal and/or dependent on which of the VIG glass sheets enclosing the evacuated gap that is the hotter one. The sealing gasket(s) comprising an interior, sealed cavity configured to comprise a pressurized fluid may help to absorb or transfer forces originating for such VIG movements. Also or alternatively, the sealing gasket(s) comprising an interior, sealed cavity configured to comprise a pressurized fluid may help to reduce or move stress conditions in the VIG unit caused by such temperature differences.

Additionally or alternatively, utilizing one or more flexible sealing gaskets comprising an interior, sealed cavity configured to comprise a pressurized fluid between the frame part, such as a frame wall, and a major surface of the VIG unit may e.g. help to provide good shock absorbance and hence good impact resistance when sudden external forces such as items, for example balls, hails, wind loads or the like, strikes the VIG unit.

The one or more elongated flexible sealing gaskets may be arranged to extend substantially parallel to, and hereby along, an edge of the vacuum insulated glass unit which it is proximate to.

In one or more aspects of the present disclosure, the edges of the vacuum insulated glass unit are configured to deflect when subjected to a temperature difference between the first and the second glass sheet. Said flexible sealing gasket may in one or more aspects of the present disclosure be configured to follow the movement of the vacuum insulated glass unit when the edges of the vacuum insulated glass unit deflects due to said temperature difference.

In one or more aspects of the present disclosure, an edge seal seals the evacuated gap between the first and second glass sheets, and wherein said edge seal is or comprises a fused edge seal.

In one or more aspects of the present disclosure, an edge seal seals the evacuated gap between the first and second glass sheets, and wherein said edge seal is or comprises a glass material or metal material.

In one or more aspects of the present disclosure, an edge seal seals the evacuated gap between the first and second glass sheets, wherein said edge seal is a solder glass edge seal or a metal solder edge seal, such as a fused edge seal.

The glass sheets of the VIG unit may be bonded together by means of an edge seal sealing the evacuated gap at the periphery of the VIG unit. This edge seal may be a solder edge seal such as a solder glass edge seal or a metal solder edge seal bonding the VIG unit glass sheets together. Such fused edge seals such as glass or metal edge seals, e.g. solder edge seals provides a fused edge seal that is very rigid. Hence, when the VIG unit is subjected to temperature differences between the glass sheets of the VIG unit enclosing the evacuated gap, the VIG unit's edges thermally deflects and may bend in the same direction and hence cause a bending curve/deflection curve at the edges along the length of the respective edge. If the VIG unit is a larger VIG unit, e.g. with an edge of a length of 0.5 meters or above, such as above 1 meter or above 1.6 meter, the thermal edge deflection may be larger as the thermal edge deflection may generally increase with increased edge length.

This may cause some issues when arranging the VIG unit in the frame in relation to e.g. stress in the glass sheets and/or edge seal of the VIG unit and/or in relation to space consumption. By providing that the flexible sealing gasket is configured to follow the movement of the vacuum insulated glass unit when the edges describes a deflection curve due to the thermal deflection, this may help to reduce this/these issues and hence help to e.g. enable a more space saving frame solution and/or a solution where stress conditions in the VIG unit may be reduced. The flexible sealing gaskets may thus help to provide tightness such as water tightness with reduced and/or redistributed stress impacts in the VIG unit originating from the flexible gasket(s) with the sealed cavity.

The fluid in the gasket cavity helps the gasket to move and thus support against the VIG unit when the VIG edges thermally deflects. The fluid in the sealed cavity is hereby displaced in the cavity to relevant location in the cavity dependent on how the VIG unit deflects.

The gasket with the sealed cavity may hence allow the VIG unit edges to thermally deflect and help to distribute forces along the edges of the VIG unit and/or help to provide improved tightness. Though, in aspects of the present disclosure, the gasket may be pressurized by the fluid to an extent where it may partly counter act/partly restrict the edge deflection.

The elongated flexible sealing gaskets comprising an interior, sealed cavity may also or alternatively be advantageous in order to provide a solution that can cope edge deflections of a VIG unit where the edge deflection switches direction over time due to that there is a switch in which VIG unit glass sheet that is the hottest.

Generally in aspects of the present disclosure, the VIG unit may be a laminated VIG unit comprising an interlayer and a lamination glass sheet or it may be an un-laminated VIG unit.

In one or more aspects of the present disclosure, said fluid in the cavity may be a gas such as air.

A gas may provide good heat insulation. Air may provide a cost efficient solution and/or is easily available. Alternatively, the fluid may be a liquid or a gel.

In one or more aspects of the present disclosure, the flexible sealing gasket may be arranged to extend into a recess in said frame part, such as a recess in or at a frame profile wall part placed opposite to a major outer surface of the vacuum insulated glass unit. This may e.g. help to maintain the gasket at the desired location over time.

In one or more aspects of the present disclosure, the flexible sealing gasket may be attached to said frame arrangement and/or to said vacuum insulated glass unit, such as by means of an adhesive.

This may e.g. help to maintain the gasket at the desired location over time.

In one or more aspects of the present disclosure, the flexible sealing gasket may abut a surface, such as an outer surface, of the vacuum insulated glass unit. This may e.g. help to provide a more simple mechanical solution and/or help to provide that the gasket may more easily follow the VIG edge when the edge of the VIG unit thermally deflects to provide a deflection curve.

In one or more aspects of the present disclosure, the building aperture cover may comprise:
  a first flexible sealing gasket comprising an interior, sealed cavity configured to comprise a pressurized fluid, where the first flexible sealing gasket is arranged between a first frame part of the frame arrangement and an outer major surface of the vacuum insulated glass unit, and
  a second flexible sealing gasket comprising an interior, sealed cavity configured to comprise a pressurized fluid, where the second flexible sealing gasket is arranged between a second frame part of the frame arrangement and another opposite outer major surface of the vacuum insulated glass unit.

This may e.g. provide a solution providing improved tightness and/or support of the VIG unit.

In one or more aspects of the present disclosure, the cavities of the first and second said flexible sealing gaskets may be configured to be in fluid communication with each other.

Hereby the gaskets may exchange fluid over time, for example, in aspects of the present disclosure, when the thermal deflection of the VIG unit changes. This may e.g. advantageous in order to adapt the volume of the cavities of the gaskets to the shape of the VIG unit.

In one or more aspects of the present disclosure, the pressure in the cavity may be higher than the ambient air pressure.

This at least applies substantially at sea level and at about 20° C. and the VIG unit arranged vertically. The pressure may in aspects of the present disclosure be above atmospheric pressure at a temperature of 20° C.

In one or more aspects of the present disclosure, said frame arrangement comprises a sash and a fixation frame, wherein said sash is connected to the fixation frame by means of one or more hinge arrangements and is configured to move relative to the fixation frame, wherein the vacuum insulated glass unit is arranged in said sash and wherein said sash comprises said frame part.

This may e.g. provide an advantageous solution where a user or a home automation system can open and close the sash, and hence open or close the building aperture cover such as a door or window. In one or more aspects of the present disclosure, said one or more hinge arrangements comprises a pivot hinge arrangement configured to provide a pivoting movement of the sash relative to the frame.

In one or more aspects of the present disclosure, the building aperture cover is a roof window. Roof windows may require more extensive tightening solutions and/or may be more subjected to larger temperature differences or variations over time. The gasket(s) with a sealed cavity may help to provide an advantageous sealing and/or support in roof windows.

In one or more aspects of the present disclosure, the wall material of the one or more flexible sealing gaskets comprises an elastomer such as natural and/or synthetic rubber. This may help to provide a gasket with an advantageous flexibility and/or resiliency. The gasket may expand in certain areas if it is compressed at other areas by e.g. thermal deflection of the VIG, thereby helping to follow the movement of the VIG unit.

It is generally understood that in some aspects of the present disclosure, the wall of the gasket may be resilient and may expand due to the pressure in the cavity.

In one or more aspects of the present disclosure, the flexible sealing gasket comprises a reinforcement structure arranged around the flexible sealing gasket, such as attached to and/or embedded in the wall of the flexible sealing gasket.

The reinforcement structure may prevent the gasket from being expanded above a certain size and/or help to provide tensile strength to the gasket. The reinforcement structure may in aspects of the present disclosure comprise a fabric, one or more cords such as steel or fibre cords, e.g. glass fibre or carbon fibre cords.

In one or more aspects of the present disclosure, an adhesive, such as a structural adhesive, is arranged to fixate the vacuum insulated glass unit to the frame arrangement such as in said sash.

The adhesive is preferably arranged so as to face an outer major surface of the vacuum insulated glass unit.

In one or more aspects of the present disclosure, the flexible sealing gasket may be arranged at the same side of the vacuum insulated glass unit as said adhesive.

This may help to provide a good fixation of the VIG unit and a good tightening of the VIG unit between the VIG unit and frame.

In one or more aspects of the present disclosure, said flexible sealing gasket may be arranged at a position between the adhesive and the edge of the vacuum insulated glass unit along which the flexible sealing gasket extends and is arranged proximate to.

In other aspects of the present disclosure, said adhesive may be arranged at a position between the flexible sealing gasket and the edge of the vacuum insulated glass unit along which the flexible sealing gasket extends and is arranged proximate to. Hence, here the flexible sealing gasket is placed closer to the window opening than the adhesive.

In one or more aspects of the present disclosure, said adhesive may adhere to the outer major surface of the vacuum insulated glass unit facing the adhesive.

In one or more aspects of the present disclosure, at least a part of, or the entire part of, the outer major surface of the vacuum insulated glass unit arranged opposite to and facing away from the adhesive is substantially exposed. Additionally or alternatively, in one or more aspects of the present disclosure, at least a part of or the entire part of the outer major surface of the vacuum insulated glass unit arranged opposite to and facing away from the flexible sealing gasket may be substantially exposed.

By the term "substantially exposed" is in this context understood that the exposed outer surface of the VIG unit opposite to the flexible sealing gasket ad/or opposite to the adhesive is visible and exposed at the side of the VIG unit facing away from the adhesive, and is thus not covered by a part of the frame. Though, a masking may be arranged to prevent the adhesive to be visible through the pane in further aspects of the present disclosure. The masking may however be embedded in a glass sheet of the VIG or arranged at a surface of the VIG that is not the exposed surface in order to obtain that the exposed surface appears flush or is flush and uninterrupted with the remaining outer surface of the VIG unit covering the aperture cover opening such as window opening. This solution with an exposed solution may e.g. help to provide aesthetic advantages.

In one or more aspects of the present disclosure, the flexible sealing gasket may comprise an inlet to the cavity and is configured to be inflated by means of a pumping arrangement, such as an active pumping arrangement, arranged to be in fluid communication with the inlet.

This may help to maintain a desired pressure in the sealed cavity/cavities of the gasket(s) over time.

In one or more aspects of the present disclosure, the pumping arrangement may comprise a an active pump such as a miniature pump or micro pump such as a microelectromechanical systems (MEMS) based pump, or it may be a diaphragm pump arrangement. The pumping arrangement may additionally or alternatively be battery driven or driven by means of pressure differences and/or temperature differences in different compartments comprising the fluid to be pressurized. It is generally understood that the active pumping arrangement may be driven by means of any suitable type of power source.

The active pumping arrangement may be powered by an electrical power source such as a battery, a thermoelectric power source and/or the like. In case the pumping arrangement is a passive arrangement, the passive pumping arrangement may e.g. comprise one or more one-way valves or the like configured to open to increase and/or decrease the pressure in the gasket(s) dependent on pressure differences between the pressure in the gasket cavity and a fluid buffer or the exterior of the gasket cavity. Such a fluid buffer may e.g. be a gasket with an internal cavity comprising pressurized fluid at the other side of the VIG unit, and/or a fluid buffer external to the gasket(s) and comprising a fluid enclosure, such as a pressurized container and/or the like.

The pumping arrangement may in aspects be external to all the flexible sealing gasket or flexible sealing gaskets in the aperture cover and connected to the cavity of this or these gaskets by means of a fluid communication line such as a tube or pipe.

In one or more aspects of the present disclosure, the pumping arrangement may be arranged in, such as incorporated in, a part of said frame arrangement, such as in a fixation frame or a sash of the frame arrangement.

This may provide an advantageous solution where the aperture cover comprises the pumping arrangement and hence e.g. more easy installation of the building aperture cover may be obtained.

The pumping arrangement may e.g. be arranged in a top part of a sash of the window which may be a desired position in case the frame is a frame in a roof window as there here may be more space. The pumping arrangement may e.g. in additional or alternative embodiments be placed at a hinged side of the building aperture cover in the fixation frame or the sash.

In one or more aspects of the present disclosure, the pumping arrangement may be arranged in, such as incorporated in, a sash of the frame arrangement.

In one or more aspects of the present disclosure, a pressure determination arrangement may be configured to monitor the pressure in said interior, sealed cavity, such as wherein a pressure control arrangement is configured to control the pumping arrangement based on said monitoring.

The pressure determination arrangement may e.g. in aspects of the present disclosure comprise a valve arrangement such as a one way valve arrangement that automatically opens when a certain pressure is exceed. Additionally or alternatively, the pressure determination arrangement may comprise a measurement circuitry such as comprising a strain gauge arrangement and/or a fluid pressure measurement arrangement, a piezometer tube, a pressure gauge or the like.

In one or more aspects of the present disclosure, a pressure determination arrangement may be configured to monitor the pressure in an interior, sealed cavity of a first flexible gasket arrangement and provide a first output accordingly, wherein a pressure determination arrangement is configured to monitor the pressure in an interior, sealed cavity of a second, flexible gasket arrangement and provide a second output accordingly. A pressure control arrangement may in further aspects be configured to control one or more pumping arrangements based on said first and second outputs.

This may help to provide an desired pressure in the gasket cavities over time.

In one or more aspects of the present disclosure, said pumping arrangement may be configured to be powered by means of a rechargeable battery such as wherein the rechargeable battery is configured to be recharged by means of a photovoltaic panel, such as a photovoltaic panel of the building aperture cover.

This may help to provide energy for the operation of the pumping arrangement over time, and it is here understood that the pumping arrangement may be an active pumping arrangement. Also, it may provide a space saving solution that may be easy to install. The rechargeable battery may preferably be installed at the building aperture cover.

In one or more aspects of the present disclosure, the pumping arrangement may be configured to provide a pressure equalization in cavities of flexible sealing gaskets (21, 22).

In one or more aspects of the present disclosure, two or more edges of the vacuum insulated glass unit may have a length that is at least one 0.8 meter, such as at least 1 meter, for example as at least 1.5 meter.

Flexible gaskets with sealed fluid containing cavities may become even more relevant at larger VIG units, e.g. as the magnitude of the thermal deflection of the edges of these VIG unit may tend to be larger than for smaller VIG units.

In one or more aspects of the present disclosure, the pressure in the cavity at a temperature of 20° C. may be between 0.5% and 50% larger than the ambient atmospheric pressure, for example between 1% and 20% larger than the ambient atmospheric pressure, such as between 1% and 10% larger than the ambient atmospheric pressure.

In one or more aspects of the present disclosure, an edge seal may seal the evacuated gap between the first and second glass sheets, and wherein said edge seal is a solder glass edge seal or a metal solder edge seal.

In one or more aspects of the present disclosure, the pumping arrangement may be arranged in, such as incorporated in, a sash of the frame arrangement.

In one or more aspects of the present disclosure, the wall of the flexible sealing gasket comprise one or more materials selected from the following list:
Natural rubber)
Styrene-butadiene rubber
Butyl rubber) such as chlorobutyl rubber (CIIR) or bromobutyl rubber (BIIR)
Nitrile rubber
Epichlorohydrin rubber
Chloroprene rubber
Polyurethane rubber
Ethylene-propylene rubber
Silicone rubber
Chlorosulphonated polyethylene rubber In one or more aspects of the present disclosure, the wall of the flexible sealing gasket comprises one or more materials selected from the following list:
Epichlorohydrin rubber
Chloroprene rubber
Polyurethane rubber
ethylene-propylene rubber
Silicone rubber
Chlorosulphonated polyethylene rubber These may be used due to for example a good weather resistance.

In one or more aspects of the present disclosure, the wall of the flexible sealing gasket comprises butyl rubber and/or Epichlorohydrin rubber.

These may e.g. provide low fluid permeability (such as low gas permeability).

In one or more aspects of the present disclosure, the evacuated gap has a thickness/width below 1 mm, such as between 0.05-0.5 mm such as between 0.09 mm and 0.25 mm.

In one or more aspects of the present disclosure, said first and a second glass sheets of the vacuum insulated glass unit are strengthened or tempered glass sheets such as thermally tempered glass sheets. Strengthened or tempered glass sheets provides improved strength and can hence allow a larger distance between the support structures and/or are allowed to bend more due to temperature differences between the glass sheets without breaking. Hence a stronger VIG unit is achieved. The one or more elongated flexible sealing gaskets may help to handle that the VIG unit edges bends.

In one or more aspects of the present disclosure, said first and a second glass sheets may have substantially the same thickness. This may be advantageous from e.g. a manufacturing related perspective and/or cost efficiency perspective.

In one or more aspects of the present disclosure, the pressure in the evacuated gap is below $10^{-4}$ bar, such as about or below $10^{-3}$ mbar. This provides improved heat insulation performance.

The reduced pressure in the evacuated gap may in aspects of the present disclosure result in an atmospheric pressure of about 10 tonnes per $m^2$, and this acts on the support structures in the evacuated gap and on the glass sheets of the VIG unit. Additionally, further stress/forces may act on the VIG unit due to deflection of the VIG unit due to a rigid, such as fused, edge seal, e.g. a metal or glass edge seal, combined with temperature differences on the outer major surfaces of the VIG.

In one or more aspects of the present disclosure, the vacuum insulated glass unit has a thickness measured between outer, outwardly facing surfaces of the VIG unit that is between 4-15 mm, such as between 4 mm-12 mm, such as between 4 mm-10 mm. Hence, a more space saving solution is achieved. In some further embodiments, said thickness may include the thickness of a lamination glass sheet and lamination interlayer. This may provide safety if the VIG unit should break due to e.g. an object striking the unit.

In one or more aspects of the present disclosure, said one or more elongated flexible sealing gaskets may be configured so as to displace with a displacement distance of at least the thickness of one of said glass sheets of the vacuum insulated glass unit due to a deflection of the vacuum insulated glass unit caused by a temperature difference between the first and the second glass sheet (compared to a scenario where the temperatures at the first and the second glass sheet are substantially identical). Additionally or alternatively, in one or more aspects of the present disclosure, said one or more elongated flexible sealing gaskets is/are configured to displace, such as be compressed or expand, with a displacement distance corresponding to at least 20%, such as at least 50%, such as at least 70% of the thickness of the vacuum insulated glass unit due to a deflection of the vacuum insulated glass unit caused by a temperature difference between the first and the second glass sheet (compared to a scenario where the temperatures at the first and the second glass sheet are substantially identical). This may provide a sufficient sealing and/or support function when the VIG unit thermally deflects due to temperature differences.

In one or more aspects of the present disclosure, said temperature difference may be at least 30° C., such as about 40° C. Larger temperature differences may cause increased bending/deflection of the VIG unit. The one or more elongated flexible sealing gaskets with the a pressurized fluid in the sealed cavity may help to handle this sufficiently.

In one or more aspects of the present disclosure, the Ug (Uglazing) value of the vacuum insulated glass unit is below 0.9 W/($m^2$k) such as below 0.7 W/($m^2$k).

In one or more aspects of the present disclosure, an edge seal seals the evacuated gap between the first and second glass sheets, and wherein said edge seal is or comprises a fused edge seal.

In one or more aspects of the present disclosure, an edge seal seals the evacuated gap between the first and second glass sheets, and wherein said edge seal is or comprises a glass material or metal material.

In one or more aspects of the present disclosure, the building aperture cover may be provided by means of a retrofitting operation where a building aperture cover frame arrangement originally configured to comprise a gas filled insulated glass units is reused for installation of the vacuum insulated glass unit and the one or more elongated flexible sealing gaskets.

The present disclosure moreover relates to a method of retrofitting a building aperture cover to comprise a vacuum insulated glass unit, wherein the method comprises removing an insulated glass unit of a building aperture cover such as a window, for example a roof window, from an existing frame arrangement, providing a vacuum insulated glass unit comprising an evacuated gap placed between a first and a second glass sheet, and wherein a plurality of support structures are arranged in the evacuated gap, and arranging the vacuum insulated glass unit in said existing frame arrangement. One or more elongated flexible sealing gaskets is/are placed between an outer major surface of the vacuum insulated glass unit and a frame part, so that the one or more elongated flexible sealing gaskets extends substantially parallel to an edge of the vacuum insulated glass unit, wherein one or more of the one or more elongated flexible sealing gaskets comprises an interior, sealed cavity configured to comprise a pressurized fluid.

Hereby a retrofitted building aperture cover such as a window is obtained, which may be more able handle temperature differences and a deflection of the VIG unit as a consequence thereof, e.g. as previously described, hence providing one or more of the previously mentioned advantages. Moreover, an environmentally friendly solution is achieved since the existing frame, or at least parts thereof, such as frame profiles is/are reused.

The retrofitting may in aspects of the present disclosure be provided while the existing frame is maintained installed at the building.

In one or more aspects of the method, the glass unit to be removed comprises one or more cavities placed between glass sheets, where the one or more cavities comprises a gas such as an inert gas, such as argon. Such glass units may be thicker/more space consuming than VIG units, and hence, space for the said gasket(s) may be provided to allow sufficient VIG deflection and/or installation may be more easy. In one or more aspects of the method, the thickness of the glass unit to be removed is larger than the thickness of the vacuum insulated glass unit to be installed in the frame arrangement.

In one or more aspects of the method, the thickness of the glass unit to be removed may be at least 30% such as at least 50%, e.g. at least 90% larger than the thickness of the vacuum insulated glass unit to be installed in the frame arrangement.

In one or more aspects of the method, the width of a space of the existing frame which is provided between walls of the existing frame, and into which an edge of the vacuum insulated glass unit will extend after the retrofitting, is between 15 mm and 80 mm, such as between 20 mm and 50 mm.

The width of a space of the existing frame may accommodate arranging at least a part of the said elongated flexible sealing gasket(s) comprising the interior, sealed cavity with the pressurized fluid therein, a part of the VIG unit (corresponding to the VIG thickness) and the profile between frame walls of the existing frame (such as a wall and a glazing member of the existing frame). In other embodiments, the said elongated flexible sealing gasket(s) comprising the interior, sealed cavity may be arranged outside the existing frame, e.g. in a retrofitting profile.

In one or more aspects of the method, the retrofitting process comprises attaching a retrofitting profile to the existing frame arrangement, wherein the one or more elongated flexible sealing gaskets are placed between an outer major surface of the vacuum insulated glass unit and a wall part of the retrofitting profile. This may help to provide or assure enhanced installation at the existing frame.

In further aspects of the method, the vacuum insulated glass unit, the one or more elongated flexible sealing gaskets and the retrofitting profile are comprised in a single, preassembled unit, wherein said preassembled unit is installed at the existing frame arrangement. This may provide a more easy installation and/or help to ensure correct installation of the VIG unit during the retrofitting process.

In some aspects of the present disclosure, the retrofitting method may provide that the one or more elongated flexible sealing gaskets is/are placed between an outer major surface of the vacuum insulated glass unit and a frame part so that the one or more elongated flexible sealing gaskets extends substantially parallel to an edge of the vacuum insulated glass unit, and this may so to say "automatically" happen if the retrofitting profile, VIG unit and one or more elongated flexible sealing gaskets with the cavity is installed at the existing frame as a single, preassembled unit, as the retrofitting profile here will act as/comprise the said frame part.

In other aspects of the present disclosure, a user may manually place the VIG unit and the one or more elongated flexible sealing gasket(s) in the existing frame, in case the retrofitting profile is omitted.

In aspects of the method, the one or more flexible sealing gaskets may be attached to said retrofitting profile, such as to walls thereof, and/or to said vacuum insulated glass unit, such as by means of an adhesive.

In one or more aspects of the method, the one or more flexible sealing gaskets may be arranged to extend into a recess in said retrofitting profile, such as a recess in or at a profile wall part placed opposite to the major outer surface of the vacuum insulated glass unit.

The retrofitting profile may in some aspects provide that the walls of the retrofitting profile extend in over major surfaces of the VIG unit with a larger distance than the existing frame would do on it's own, this may be provided e.g. in order to reduce the risk of condensation issues due to the edge seal of the VIG unit acting as a thermal bridge.

In one or more aspects of the method, the method comprises removing glazing members of the existing frame from the frame, arranging the vacuum insulated glazing unit in the existing frame, and subsequently reconnecting a glazing member, such as the removed glazing member, to the existing frame.

In one or more aspects of the method, the method results in providing a building aperture cover according to one or more of the previously described aspects.

FIGURES

Aspects of the present disclosure will be described in the following with reference to the figures in which:

FIG. 1: Illustrates an aperture cover according to embodiments of the present disclosure, FIG. 2: illustrates a VIG unit according to embodiments of the present disclosure, FIGS. 3-4: illustrates roof windows according to embodiments of the present disclosure, FIG. 5: illustrates a frame arrangement with a VIG unit according to embodiments of the present disclosure comprising gaskets with sealed cavities FIG. 6: illustrates a frame arrangement with a VIG unit according to embodiments of the present disclosure comprising a gasket with a sealed cavity and an exposed outer major surface in the frame region, FIG. 7: illustrates a frame arrangement comprising a base member and a glazing member according to embodiments of the present disclosure FIGS. 8-9: illustrates a gasket with a sealed cavity arranged in a recess according to embodiments of the present disclosure, FIG. 10: Illustrates a building aperture cover with a pumping arrangement according to embodiments of the present disclosure, FIGS. 11a-11b: Illustrates pumping arrangements according to further embodiments of the present disclosure, FIG. 11c: Illustrates a pumping arrangement comprising a fluid buffer according to embodiments of the present disclosure, FIGS. 12-13: Illustrates a VIG unit subjected to thermal edge deflection and thus providing an edge deflection curve caused by a temperature difference between glass sheets of the VIG unit, according to embodiments of the present disclosure, FIGS. 14-15: Illustrates a VIG unit displacing fluid in interior, sealed cavity of a gasket according to embodiments of the present disclosure, FIG. 16: Illustrates a visualized computer simulation of a thermal deflection of a VIG unit according to embodiments of the present disclosure, FIGS. 17-18: Illustrates a thermal deflection test of a laminated VIG unit, according to embodiments of the present disclosure, FIG. 19-20: illustrates a gasket arrangement comprising two cavities connected by a flexible wall part according to embodiments of the present disclosure, FIGS. 21a-21b: illustrates a VIG unit and one or more gaskets comprising a sealed interior cavity comprising a fluid according to embodiments of the present disclosure, FIG. 22: illustrates a solution with an external pumping arrangement according to embodiments of the present disclosure, FIG. 23: illustrates flexible sealing gaskets comprises an interior, sealed cavity that is displaced by a VIG unit with a displacement distance due to a deflection of the VIG unit caused by temperature differences, according to embodiments of the present disclosure, FIG. 24: illustrates a building aperture cover after a retrofitting operation where the frame of an existing building aperture cover is reused for installation of a VIG unit, according to embodiments of the present disclosure, and FIG. 25: illustrates a building aperture cover after a retrofitting operation in an existing frame comprising a detachable/removable glazing member profile.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a building aperture cover in the form of a window 1 according to embodiments of the present disclosure. The window comprises a vacuum insulated glass (VIG) unit 3 fixed in a frame 2. The frame 2 comprises elongated frame arrangements 30a-30d, and the VIG unit is arranged to cover a frame opening 2a in the frame. The frame defines a frame opening plane P2, and in FIG. 1, the window is seen from the outside towards the exterior surface S1 of the VIG unit.

The frame arrangements 30a-30d comprises substantially parallel top 30d and bottom 30c frame arrangements and substantially parallel side profile frame arrangements 30a, 30b.

A gasket arrangement, a bonding seal (described in more details later on) or the like may be arranged to seal a space between a part of the frame and the VIG unit. In the present example, the gasket or bonding seal (or only one of these) defines a "line of sight" through the frame opening 2a and through the VIG unit in the frame. The line of sight LS may generally be defined by an envisaged line that is perpendicular to the outer major surface S2 of the VIG unit and which provides the outermost border for a view through the VIG unit and frame opening 2a from the interior side and exterior side of the VIG unit. Other structural members such as wall parts of the frame or a masking of the VIG unit may though also or alternatively provide the line of sight LS along one or more of the elongated frame arrangements 30a-30d.

Figure 2:
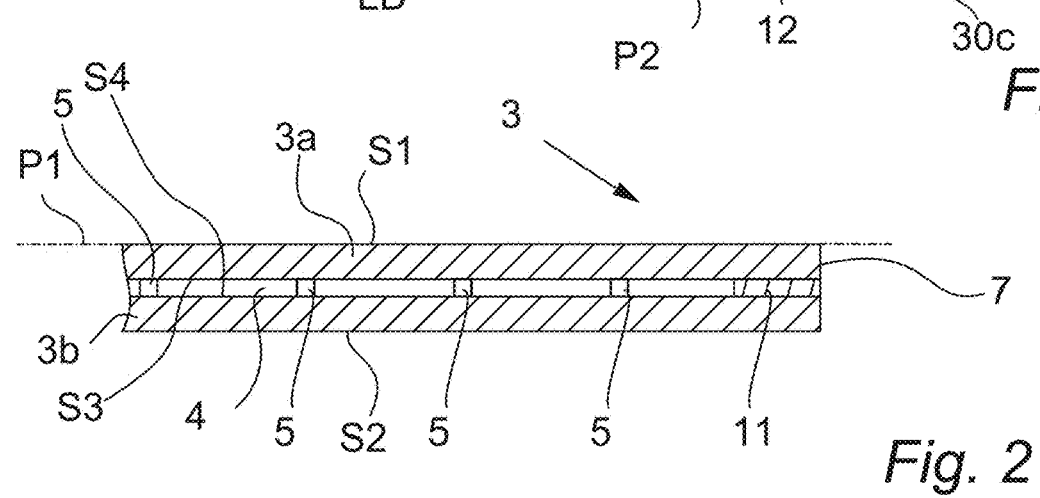

FIG. 2 illustrates schematically a cross sectional view of a VIG unit 3 to be arranged in the frame 2 according to embodiments of the present disclosure. The VIG unit 3 comprises two glass sheets 3a, 3b such as strengthened or tempered glass sheets, e.g. thermally tempered glass sheets, but one or both glass sheets 3a, 3b may also be float glass sheets such as annealed glass sheets.

The glass sheets 3a, 3b are separated by an evacuated gap 4 between the glass sheets 3a, 3b, and a plurality of support structures 5 are distributed in the gap 4. The gap 4 may for example have a thickness/width of between 0.05-0.5 mm such as between 0.09 mm and 0.25 mm (measured normal to a plane P1 defined by a major surface of one of the VIG unit glass sheets 3a, 3b at a temperature difference between the VIG glass sheets 3a, 3b of substantially 0° C. The gap 4 is sealed by an edge sealing 11, such as a fused edge sealing, which may e.g. be made from a solder glass material, e.g. low melting temperature solder glass material, or a metal solder material.

The gap 4 may for example, in embodiments of the present disclosure have a thickness/width below 1 mm.

The support structures 5 may for example be made from metal, such as a steel alloy, glass or a polymer composition and be arranged in a grid or another pattern to maintain the gap 4 between the glass sheets 3a, 3b when the gap 4 is evacuated to a pressure below e.g. $10^{-3}$ bar, such as below $10^{-4}$ bar, e.g. to about or below $10^{-3}$ mbar. The glass sheets 3a, 3b comprises inner major surfaces S3, S4 facing the evacuated gap 4, and the support structures 5 support on these inner major surfaces. The VIG unit also comprises outwardly facing major surfaces S1, S2 facing away from the gap 4. As can be seen, the outer major surfaces may be substantially parallel and the distance between the surfaces S1, S2 may corresponds to the thickness of the VIG unit.

Especially if the VIG unit glass sheets 2a, 2b are tempered glass sheets, the distance/pitch between neighbouring/adjacent support structures 5 may be above 3 cm or above 4 cm, such as between 3 cm and 6 cm in the evacuated VIG unit gap 4.

In one or more embodiments of the present disclosure, the Ug (Uglazing) value of the vacuum insulated glass unit may be below 0.9 W/(m$^2$k) such as below 0.7 W/(m$^2$k).

The VIG unit's thickness, measured between the outer, outwardly facing surfaces S1, S2 of the VIG unit, determined in a direction normal to these surfaces, may in embodiments be between 4-15 mm such as between 4-12 mm, e.g. 4-10 mm. This thickness may preferably include an optional lamination glass sheet and lamination interlayer.

Hence, the VIG unit thickness may be a sum of the thickness of the evacuated gap and the thickness of the VIG unit glass sheets 3a, 3b. In case the VIG unit is laminated, the thickness of the VIG unit may be the sum of the thickness of the evacuated gap, the thickness of the VIG unit glass sheets 3a, 3b and the thickness of the lamination interlayer (e.g. a PVB or EVA interlayer) and the thickness of the lamination glass sheet. This may include any coatings placed on the glass sheets.

In one or more embodiments of the present disclosure, one or both glass sheets 3a, 3b of the VIG unit may have a thickness between 2 mm and 6 mm, such as around 3 mm to 5 mm, for example about 4 mm. In embodiments of the present disclosure, both glass sheets 3a, 3b of the VIG unit may have a substantially similar/the same thickness. In other embodiments of the present disclosure, the thickness of the glass sheets 3a, 3b of the VIG unit may be different.

The VIG unit 1 may also be a laminated VIG unit and/or a VIG unit of a hybrid type comprising a further glass sheet providing a further sealed gap between this glass sheet and the VIG unit that may be filled with a gas.

The VIG unit 1 defines a VIG unit plane P1 that will extend parallel to or coincide with the frame opening plane P2 (see FIG. 1) when the VIG unit is arranged in the frame 2. This plane P1 may e.g. be determined when the VIG unit glass sheets 3a, 3b have the substantially same temperature and no substantial thermal deflection of the VIG unit occur, i.e. when a temperature difference (ΔT) between the glass sheets 3a, 3b enclosing the gap is substantially 0 (ΔT=0° C.).

The VIG unit 3 may be arranged in a frame in form of a sash (6—see e.g. FIG. 3-4) which is connected to a fixation frame by means of a displacement mechanism such as one or more hinged connections configured to allow the sash to move relative to the fixation frame. Hence a user, such as a habitant living in a building comprising the window may open and close the window by operating the sash, either by hand or by a remote control, such as a wireless remote control, that is configured to control an electrically operated actuator device such as a linear actuator such as a spindle or chain drive. In other embodiments, the frame may also be fixed in an un-openable manner to the fixation frame or directly to a building structure.

Figure 3:
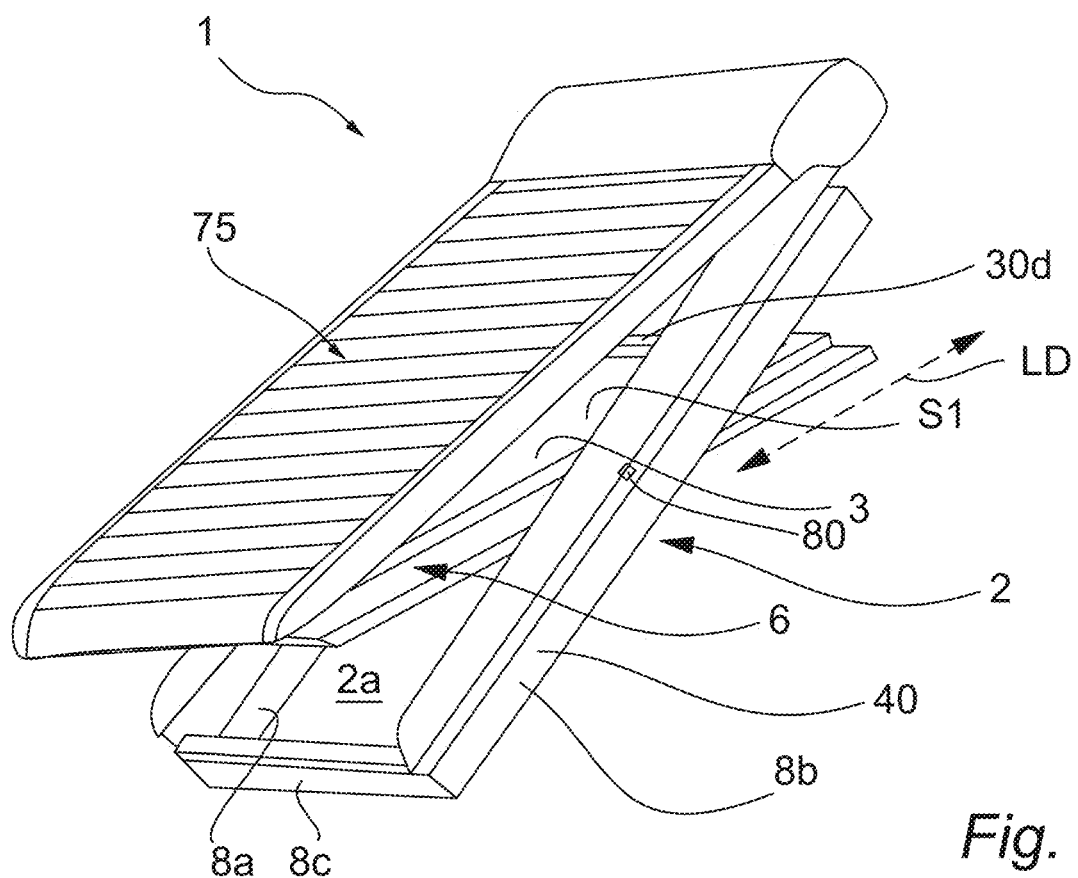

FIG. 3 schematically illustrates an embodiment of the present disclosure, wherein the building aperture cover is a roof window 1. The roof window is configured to be placed in a roofing structure of a building, such as a building for habitants, an office building or the like. The roof window may in embodiments of the present disclosure be arranged between two roof trusses, but it may also be arranged to another part of the roof structure in further embodiments.

The roof window may either be configured to be arranged with an angle between 5° and 85°, such s between 10° and 75°, compared to horizontal, and rain and melting water, dew and the like will thus be guided towards a bottom part/end of the window due to gravity.

The VIG unit is arranged in the roof window in a movable sash 6 of the frame. The movable sash 6 which is connected to a fixation frame 40 of the aperture covering 1 by means of a displacement mechanism 80 such as one or more hinged connections configured to allow the sash 6 to move relative to the fixation frame 40. In the example of FIG. 3, the roof window is a pivot roof windows comprising pivot hinges 80 providing an axis of rotation placed between the top and bottom of the sash. Often the axis of rotation is substantially about the centre. But sometimes the axis of rotation can for example be raised such as ⅓ of the total window or sash height. The hinge connection 80 is preferably configured so that a top end part of the sash is configured to move inwards and a bottom end part of the sash is configured to move outwards when opening the sash from a closed position.

A pivot roof window may e.g. allow rotation of the sash 2 so the exterior surface S1 of the VIG unit may be cleaned from the inside. The weather proofing and water drain for especially roof windows should be carefully designed for roof windows that can be opened, including pivoting roof windows.

As can further be seen, the roof window in FIG. 3 may in embodiments of the present disclosure comprise an architectural covering 75, in the present example a roller shutter, but it may also be a blind such as a venetian blind, a roller blind or the like in further embodiments. The roller shutter may be electrically operated by means of an electric motor (not illustrated), so as to open or close the roller shutter and controlled by an automation solution and/or by means of a wired or wireless remote control. As can be seen, the roller shutter can be placed at the exterior side of the window.

It is however understood that in further embodiments of the present disclosure, the roller shutter and/or other types of architectural coverings may be omitted from the roof window.

Figure 4:
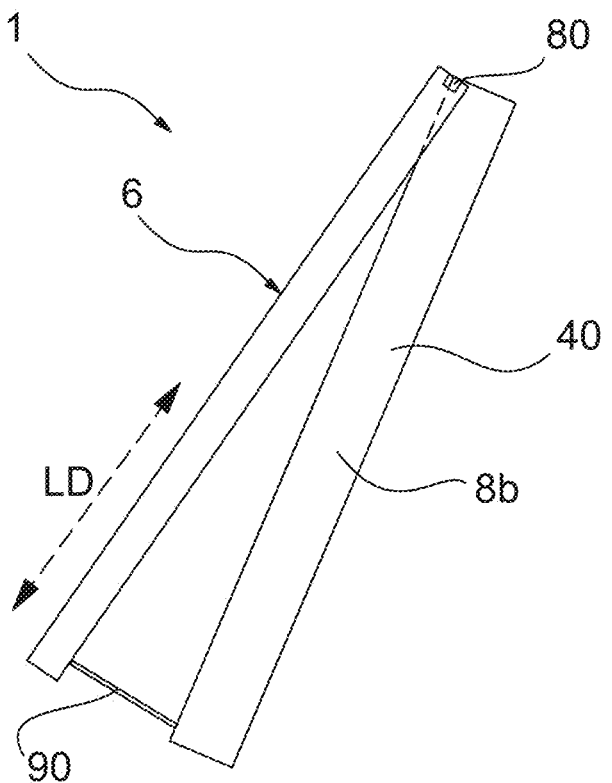

FIG. 4 schematically illustrates a roof window 1 according to an embodiment of the present disclosure, seen from the side, wherein the roof window is a top hung roof window. Here, the sash 6 is connected to the fixation frame 40 at the top part by a hinge arrangement 80, and the top part does hence not pivot inwards when the sash with the VIG unit is opened.

Generally, for both types of roof windows as illustrated in FIGS. 3 and 4, the window may as illustrated in FIG. 4 be assigned with an electric actuator 90 such as a spindle actuator or chain actuator that can be operated in response to an input from an automation system or a wired or wireless remote control to open or closed the sash 2.

The actuator 90 may be arranged at the top part (relevant for the pivot roof window) or bottom part of the sash.

The building aperture cover 1 according to the present disclosure, such as a window as described above, comprises one or more elongated flexible sealing gaskets arranged between an outer major surface S1, S2 of the vacuum insulated glass unit and a frame part of the frame. The one or more elongated flexible sealing gaskets is/are arranged to extend substantially parallel to an edge of the vacuum insulated glass unit, and the elongated flexible sealing gaskets comprises an interior, sealed cavity configured to comprise a pressurized fluid.

Figure 5:
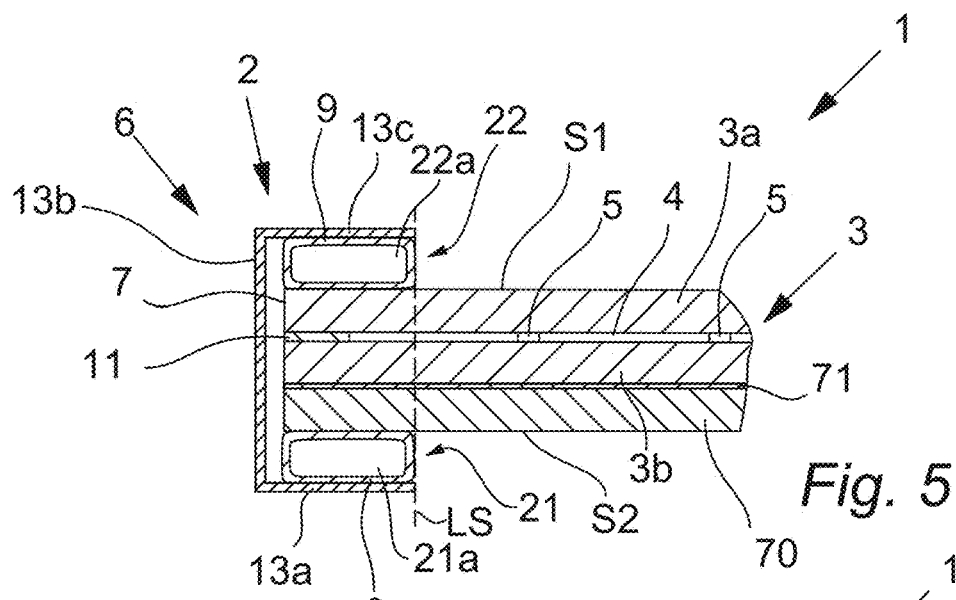

FIG. 5 illustrates schematically cross sectional view of an elongated frame arrangement according to embodiments of the present disclosure, wherein the building aperture cover 1 comprises elongated flexible sealing gaskets 21, 22 arranged to extend substantially parallel to an edge of the vacuum insulated glass unit, and where the elongated flexible sealing gaskets comprises an interior, sealed cavity configured to comprise a pressurized fluid.

It is generally understood that as described previously the VIG unit 3 may be a laminated VIG unit, and hence the glass sheet 3*a* provides one of the outer exterior major surfaces S1 whereas the other outer major surface S2 is provide by the lamination glass sheet 70. The lamination interlayer 71 may be PVB, EVA or the like. The surface S2 may preferably be the interior surface, i.e. the surface to face the interior of the building, whereas the other surface 51 may be the exterior surface, i.e. the surface to face away from the building interior.

The flexible seaming gaskets 21, 22 comprises an interior cavity 21*a*, 22*a* and act as cushions. The interior cavity is filled with a fluid such as air, and the gasket is sealed in order to maintain the pressure in the gasket cavity 21*a*, 22*a*.

The pressure in the cavity 21*a*, 21*b* may in embodiments of the present disclosure be above atmospheric pressure, such as between 0.5% and 100% larger than the ambient atmospheric pressure, e.g. between 0.5% and 50% larger than the ambient atmospheric pressure, for example between 1% and 20% larger than the ambient atmospheric pressure such as such as between 1% and 10% larger than the ambient atmospheric pressure.

The pressure in the gasket cavity 21*a*, 22*a* may provide that the gasket wall is extended to VIG unit and the frame part. The wall 9 of the gasket may be resilient and may expand due to the pressure of the fluid in the cavity.

The gasket 22 is placed between the major surface S1 and the frame part 13*c*. The gasket 22 is placed between the surface S2 and the frame part 13*a*. The fluid pressure in the cavities 22*a*, 21*a* expands the gaskets 21, 22 and hereby movably retains the VIG unit spaced apart from the frame parts 13*a*, 13*c* such as frame walls.

The gaskets 21, 22 are in FIG. 5 placed opposite to each other and also opposite to the edge seal 11 so that the edge seal extends in between the gaskets 21, 22.

The wall material 9 of the flexible sealing gaskets 21, 22 is impermeable to the fluid in the cavity 21*a*, 22*a*, and may in embodiments of the present disclosure comprise a elastomer such as natural and/or synthetic rubber.

The gasket wall may comprise one or more elastomer material selected from the following list:
  NR (natural rubber)
  SBR (styrene-butadiene)
  IIR (Butyl rubber) such as chlorobutyl rubber (CIIR) or bromobutyl rubber (BIIR)
  NBR (Nitrile rubber)
  ECO and/or CO (Epichlorohydrin rubber)
  CR (Chloroprene rubber)
  AU and/or EU (Polyurethane rubbers)
  EPM and/or EPDM rubber (ethylene-propylene rubber)
  Q (silicone rubber)
  CSM (chlorosulphonated polyethylene rubber)

ECO and/or CO rubber, CR rubber, AU and/or EU rubbers, EPM and/or EPDM rubber, Q rubber and/or CSM rubber may in embodiments of the present disclosure be used in order to e.g. obtain good weather resistance.

IIR rubber ECO and/or CO rubber may in embodiments of the present disclosure be used in order to e.g. provide low fluid permeability (such as low gas permeability).

It is generally understood that the wall 9 of the flexible sealing gasket 21*a*, 22*a* may comprise a layered structure comprising two or more layers of the same or different materials, e.g. bonded together, in order to reduce the permeability of the wall 9 to the fluid in the cavity 21*a*, 22*a*. These materials may e.g. comprise one or more of the above mentioned elastomer materials, and or another further material.

The frame comprises in FIG. 5 a wall 13*b* part extending opposite to the VIG edge 7. In embodiments of the present disclosure, the pressure in the cavity 21*a*, 22*a* may be higher than the ambient air pressure. This may be determined at a temperature of about 20° C. with the VIG unit arranged vertically, for example at ground level or sea level.

Figure 6:
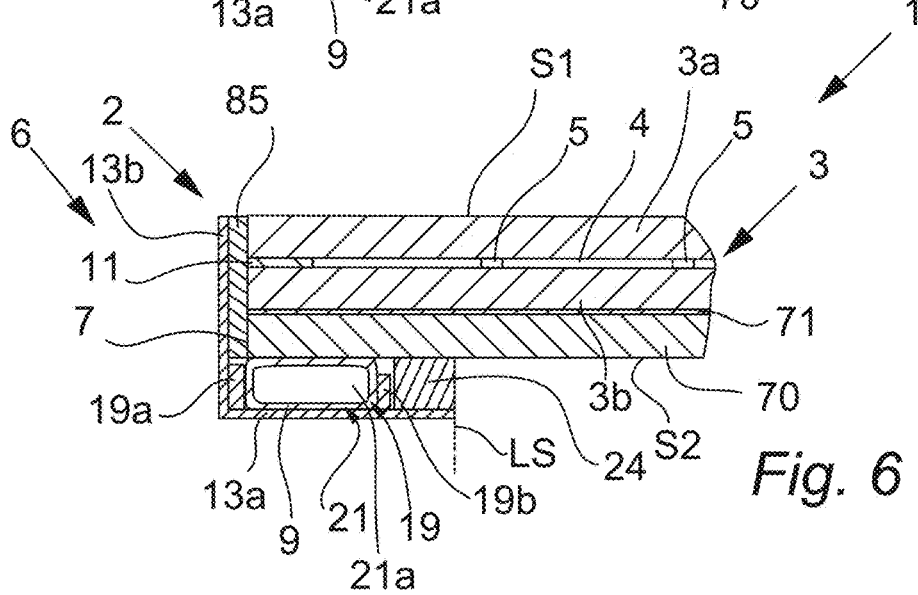

FIG. 6 illustrates schematically an embodiment of the present disclosure wherein the building aperture cover 1 comprises just one flexible gasket 21 with a sealed interior cavity 21*a*, the major surface S1 of the VIG unit opposite to the gasket 21 and facing away from the gasket 21 is exposed and visible from the exterior.

FIG. 6 moreover illustrates a further embodiment of the present disclosure wherein a further gasket 24 is placed next to the gasket 21 comprising the sealed, fluid containing cavity 21*a*, and closer to the line of sight LS than the gasket 21. This further gasket 24 may e.g. comprise a structural adhesive providing that the VIG unit adhere to the frame part 13*a*. The structural adhesive may e.g. comprise a silicon adhesive, a silane-terminated polyurethane (SPUR) adhesive or a Modified-Silyl Polymer (SMP) adhesive. The adhesive 24 is arranged to fixate the vacuum insulated glass unit to the frame arrangement 2 such as in a sash 6 (see FIGS. 3 and 4). The flexible sealing gasket 21 is arranged at a position between the adhesive 24 and the edge 7 of the vacuum insulated glass unit 3 along which the flexible sealing gasket 21, 22 extends and is arranged proximate to.

It is generally understood that the gasket 21 (and 22 in further embodiments of the present disclosure), helps to accommodate a thermal deflection of the VIG unit edge where the corners and centre part of the VIG unit moves towards or away from the frame part and describes a deflection curve dependent on which pane/glass sheet 3*a*, 3*b* that is the hotter one. The thermal deflection of the VIG unit edge is described in more details later on.

The adhesive 24 adheres to the outer major surface S2 of the vacuum insulated glass unit facing the adhesive. In some embodiments (not illustrated) the adhesive 24 may adhere to a layer or plate placed between the surface S2 and the adhesive 24, and where this layer or plate is then fixed to the VIG unit surface S2.

In embodiments of the present disclosure, as e.g. illustrated in FIG. 6, at least a part of, or the entire part of (as illustrated), the outer major surface S1 of the vacuum insulated glass unit arranged opposite to and facing away from the adhesive 24 may be substantially exposed.

A masking such as a glass masking or enamel masking (not illustrated) may in embodiments of the present disclosure be placed on the VIG unit or between the VIG unit and frame part 13*a*, in order to visually hide the frame from a view through the VIG unit 3 opposite the exposed part of the surface S1 opposite to the frame part 13*a*.

It is though understood that the design with the sealed gasket 21 and the adhesive 24 may be repeated at the other side S1, so that the part of the surface S1 which is overlapped by the frame part 13*c*, 23*c*, the structural adhesive 24 and the gasket (in that case gasket 22) is not exposed and thus not visible.

The further gasket 24 may in embodiments of the present disclosure be substantially continuous around the perimeter of the VIG unit, inward of the edge.

FIG. 6 moreover illustrates an embodiment of the present disclosure wherein a tightening material 85 is placed between the wall part 13*b* and the edge surface of the VIG unit. The tightening seal 85 may e.g. comprise a silicone material or a butyl material and extend along the surface 7 so as to help to reduce or substantially prevent water such as rainwater or water from condensation entering in between the edge surface 7 and the wall 13*b*.

In FIG. 5 (and FIG. 9), the frame parts 13*a*, 13*c* are provided by a U-shaped, thin-walled profile made from a plate material such as a metal, a plastic material or a fibre reinforced material such as a carbon fibre or glass fibre reinforced wall material that may have been extruded or pultruded. Also, in FIG. 6 the frame part 13*a* is provided by a U-shaped, thin-walled profile made from a plate material of e.g. a material as mentioned above. This plate material may e.g. have been extruded, pultruded, co-extruded and/or rollershaped into the desired shape.

Figure 7:
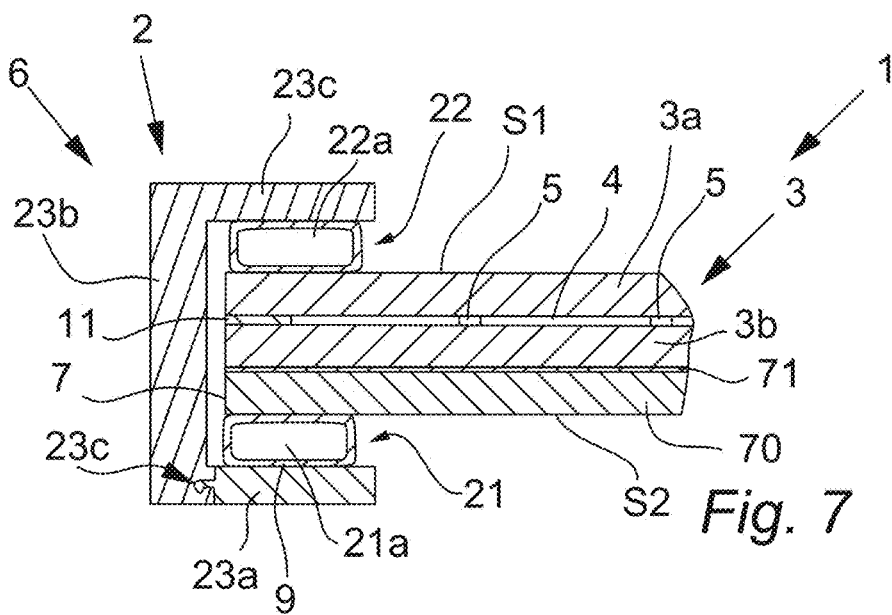
Figure 8:
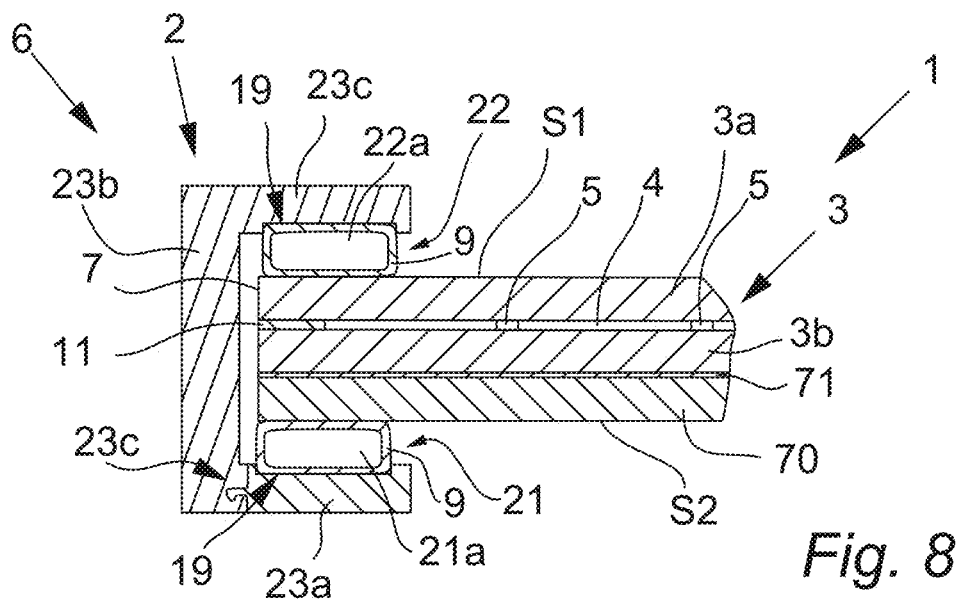
Figure 9:
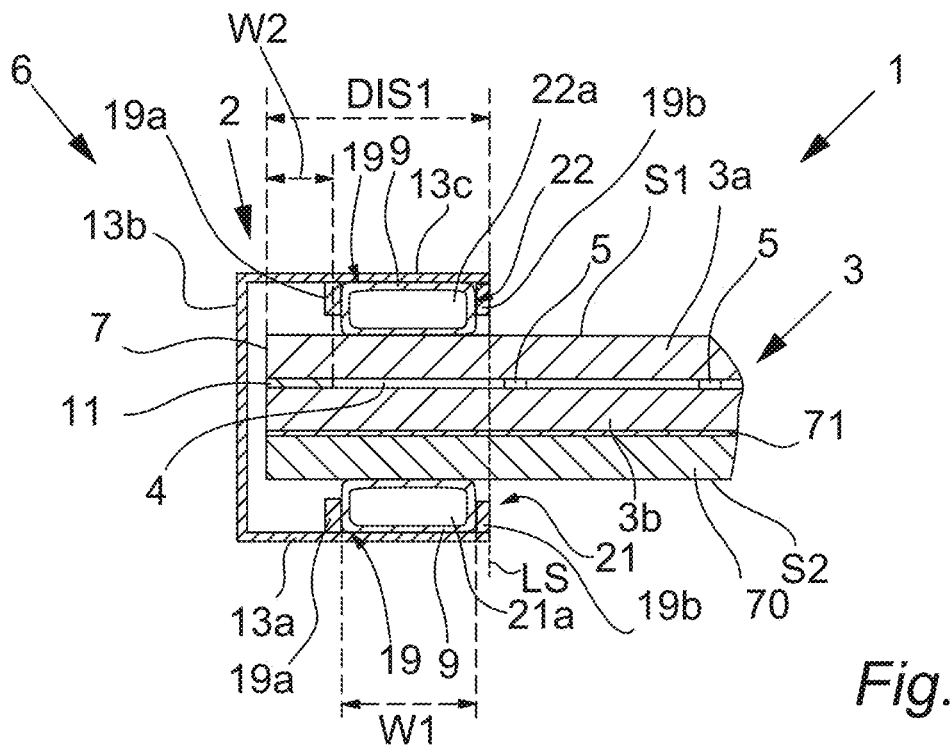

In FIGS. 7 and 8 (illustrating a frame solution according to further embodiments of the present disclosure), the frame part(s) have a greater wall thickness than the plate material illustrated in FIGS. 5 and 9. The frame parts are here provided by a base member comprising the wall parts 23*c* and 23*b*, and a glazing member 23*a*. The glazing member is attached to the base member by a connection system 23*c* such as a latch- and notch connection, but other connection systems may additionally or alternatively be used. The gasket 21 is placed between the glazing member 23*a* and the surface S2, whereas the gasket 22 is placed between the frame part 23*c* of the base member and the major surface S1. It is understood that the glazing member may be an elongated member and considered a part of the frame arrangement.

The base member and/or the glazing member may comprise cavities (not illustrated) comprising an insulating material such as air, a foam insulation material and/or the like in order to enhance heat insulation of the frame. Alternatively or additionally, the base member and/or glazing member may comprise elongated strengthening parts (not illustrated) such as metal plates or rods, or fibre plates or rods for increasing the stiffness of the glazing member and/or base member.

FIGS. 6, 8 and 9 further illustrates an embodiment of the present disclosure wherein the flexible sealing gasket 21, 22 is arranged to extend into a recess 19 in the frame parts 13*a*, 13*c* or 23*a*, 23*c*.

In FIGS. 6 and 9 this recess 19 is provided by elongated wall parts 19*a*, 19*b*, where at least one of these wall parts extends from the surface of the frame wall part facing the VIG unit. In FIG. 8, the recess 19 is provided in the wall part itself as an integrated, recessed portion in the respective frame wall part 23*a*, 23*b*. In further embodiments, the recesses in the glazing member and/or base member of FIG. 8 may be of the type provided by walls extending from the interior surface of the parts 23*a* and/or 23*c* as illustrated in FIG. 6.

In embodiments of the present disclosure, the gasket 21, 22 may be glued (not illustrated) to the frame part 13*a*, 13*c*, 23*a*, 23*c* and/or to the VIG unit. This may e.g. help to keep the gasket 21, 22 in place over time. This glue may be provided in embodiments of the present disclosure where the recess 19 is provided or where the recess 19 is omitted.

In still further embodiments of the present disclosure (not illustrated), the gasket 21, 22 may comprise a connection member such as a latch or the like which extend into a notch part in the frame so that the gasket is fixed to the frame and thereby kept in place over time.

The flexible sealing gasket 21, 22 may in embodiments of the present disclosure comprise a reinforcement structure (not illustrated) attached to and/or embedded in the wall 9 of the flexible sealing gasket. This reinforcement structure may though be omitted in further embodiments of the present disclosure. The reinforcement structure may prevent the gasket from being expanded above a certain size and/or help to provide tensile strength to the gasket. The reinforcement structure may in aspects of the present disclosure comprise a fabric, one or more cords such as steel or fibre cords, e.g. glass fibre or carbon fibre cords or comprise one or more materials similar to the material(s) of the frame parts 13*a*, 13*c*, 23*a*, 23*c*. The reinforcement structure may also or alternatively be arranged around the gasket 21, 22 without being attached to or embedded therein in order to provide a "tyre" functionality.

FIGS. 5-8 all illustrates embodiments of the present disclosure wherein the sealing gasket 21, 22 are placed opposite to the edge seal 11, and in FIGS. 5, 7 and 8 the edge seal 11 is located between the gaskets 21, 22 comprising the sealed cavity 21*a*, 22*a*. In these FIGS. 5-8, the gaskets 21, 22 partly overlaps the evacuated gap, but the gaskets may also only be placed opposite the edge seal 11 and not overlap the evacuated gap 4.

FIG. 9 illustrates schematically further embodiments of the present disclosure where the gaskets 21, 22 are instead placed opposite to the evacuated gap 4 between the frame parts 13*c*, 13*a* and the VIG unit's 3 respective major outer surface S1, S2. In FIG. 9, the entire gasket 21, 22 are placed opposite to the gap 4 and does hence not overlap the edge seal 11. This may for example help to reduce condensation issues due to a cold bridge at and near the edge seal 11.

The frame parts 13*c*, 13*a* (and/or 23*a*, 23*c* dependent on the solution) extends with a distance DIS1 in over the outer surface S1, S2 of the VIG unit from the edge 7 of the vacuum insulated glass unit as also illustrated in FIGS. 5-8 though reference DIS1 is not illustrated in these. Generally, the distance DIS1 may in embodiments of the present disclosure be no more than 70 mm, such as no more than 50 mm, such as no more than 30 mm, for example no more than 20 mm, and determined at a distance parallel to the surface S1 and perpendicular to the longitudinal direction LD of the edge 7.

The distance DIS1 may in embodiments of the present disclosure be at least two times the width W2 of the edge seal 11, such as at least three times the width of the edge seal 3, measured along an inner surface facing the gap of one of the VIG glass sheets in a direction perpendicular to the nearby edge 8*b*. In embodiments of the present disclosure, the distance DIS1 is between two and six times, such as between two and five times the edge seal width W2.

It is generally understood that the width W1 of the sealing gaskets 21, 22 may in embodiments of the present disclosure be between 5 mm and 50 mm, such as between 8 mm and 40 mm, for example between 10 mm and 30 mm. In additional or alternative embodiments of the present disclosure, the gaskets may have a width W1 below 50 mm, for example below 40 mm or below 30 mm. This width W1 may be determined at a temperature of 20° C. at both sides of the VIG unit, in a direction perpendicular to the longitudinal extent of the respective gasket 21, 22. The aperture cover 1 may here be held vertically (i.e. the planes P1, P2 as previously described are substantially vertical).

As mentioned above, FIG. 9 illustrates a further embodiment of the present disclosure wherein the gaskets 21, 22 are placed in a recess. It is understood that the recess may though be omitted or replaced by an adhesive providing that the gasket 2, 22 adheres to the VIG unit.

In FIGS. 5-10, the sealed gaskets 21, 22 are arranged to abut the outer VIG unit surface, though possibly with an adhesive in between the VIG unit surface S1, S2 and the gasket 21, 22 in certain embodiments of the present disclosure. However, it is understood that further layers may also be placed between the VIG unit surface S1, S2 and the gasket (not illustrated).

Figure 10:
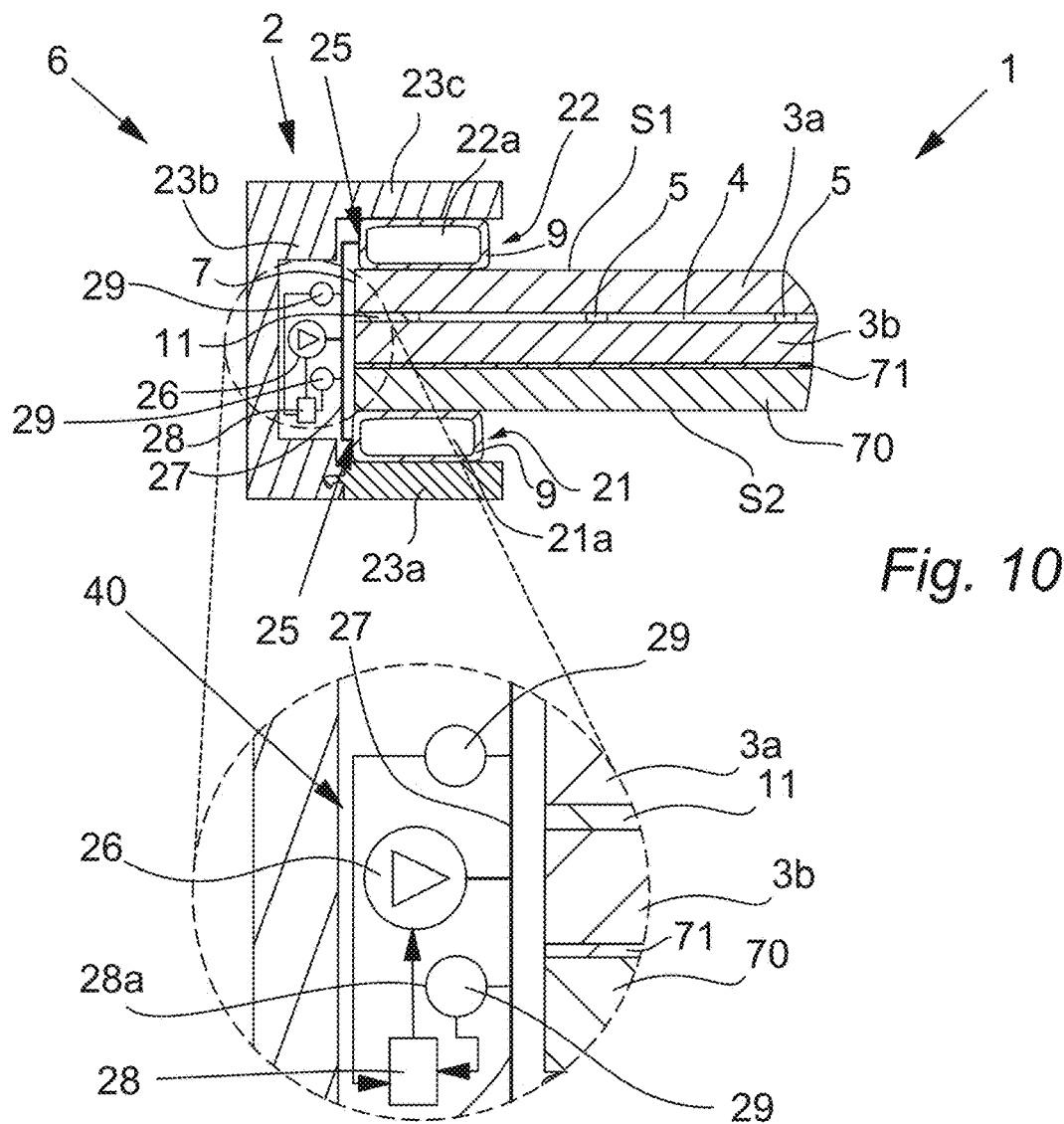

FIG. 10 illustrates schematically an embodiment of the present disclosure wherein the flexible sealing gasket 21, 22 with the sealed cavity 21a, 22a comprises an inlet 25 to the cavity 21a, 22a. The inlet 25 is in fluid communication with a pumping arrangement 26. The pumping arrangement 26 is configured to inflate the gasket 21, 22 by supplying a fluid such as a gas, e.g. air through a fluid communication line 27.

In one or more embodiments of the present disclosure, the pumping arrangement 26 may comprise a miniature pump or micro pump such as a microelectromechanical systems (MEMS) based pump, or it may be a diaphragm pump arrangement. The pumping arrangement 26 may additionally or alternatively be battery driven or driven by means of pressure differences and/or temperature differences in different compartments comprising the fluid to be pressurized. It is generally understood that the pumping arrangement 26 may be driven by means of any suitable type of power source.

In embodiments of the present disclosure, the pumping arrangement is arranged in, such as incorporated in, a part of said frame arrangement 2. In FIG. 10, the pumping arrangement 26 is incorporated in the sash 6 of the frame arrangement 2.

As illustrated, a pressure determination arrangement 29 may in embodiments of the present disclosure be configured to monitor the pressure in the interior, sealed cavity 21a, 22a. A pressure control arrangement 28 such as a valve arrangement or a micro controller arrangement is configured to control the pumping arrangement 26 based on this monitoring. Hence, if a pressure in one of the cavities 21a, 22a decreases to a value below a certain level, the pumping arrangement provides further fluid into the relevant cavity 21a, 22a.

A one way over-pressure valve (not illustrated) may be arranged in the gasket 21, 22 in order to release fluid in the cavity 21a, 22a in case it increased to an undesired level. This one way over-pressure valve may be passive or controlled actively by the pressure control arrangement 28.

The pressure determination arrangement 28 may comprise a pressure measurement instrument such as a pressure transducer. For example it may be a capacitance manometer solution, a piezoresistive pressure sensor, a piezometer tube, a pressure gauge or a strain gage solution. In case of a strain gauge solution, the strain gauge(s) may be placed at the wall of the gasket 21, 22. It is however understood that any suitable pressure determination arrangement 28 may be used.

The pressure control arrangement 28 provides a control signal 28a to the pumping arrangement 26 in order to start and stop the pumping arrangement 26. The pressure control arrangement 28 may be considered external to the pumping arrangement 26 or considered integrated in the pumping arrangement 26.

In FIG. 10, one pressure determination arrangement 29 is used for each gasket 21, 22, and the pumping arrangement 26 can adjust the pressure in each gasket 21, 22 individually. This may e.g. be obtained by means of a valve solution (not illustrated) where valves at the inlet 25, in the fluid communication line 27 or in the pumping arrangement 26 itself can be operated to control into which gasket the fluid should be pumped based on the information from the respective pressure determination arrangement 29.

Hence, in FIG. 10, a pressure determination arrangement 29 is configured to monitor the pressure in the interior, sealed cavity 21a of the flexible gasket arrangement 21 and provide a first output accordingly. Moreover, a pressure determination arrangement 29 is configured to monitor the pressure in an interior, sealed cavity 22a of a second, flexible gasket arrangement 22 and provide a second output accordingly. The pressure control arrangement 28 is thus configured to control the pumping arrangement 26 based on said first and second outputs.

Figures 11A, 11B:
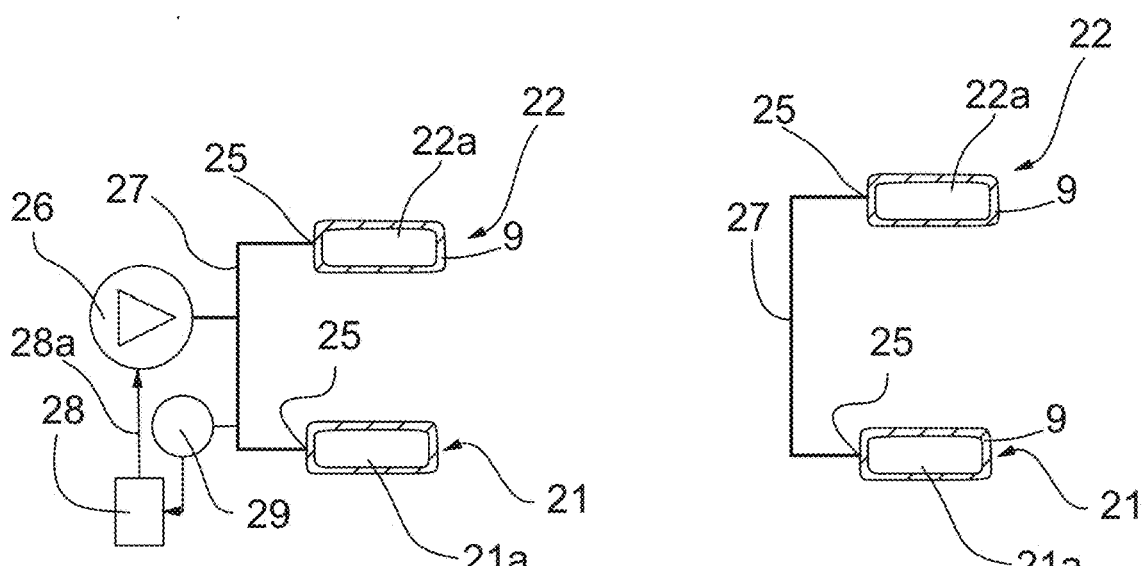

FIG. 11a illustrates schematically an embodiment of a pumping arrangement solution (VIG unit, frame and the like have been omitted for drawing simplicity) where just one pressure determination arrangement 29 is used, according to embodiments of the present disclosure. Here the gaskets 21, 22 are in fluid communication with each other through a fluid communication line 27. If no valves or the like are arranged to prevent flow of fluid between the two compartments/cavities 21a, 22a, the pressure in the cavities 21a, 22a are automatically equalizing by means of the fluid communication line. Hence, if one of the gaskets 21, 22 are compressed due to a thermal deflection of a VIG unit edge, some of the fluid in the cavity of that gasket may be forced by the VIG unit to move through the fluid communication line 27 and to the cavity of other gasket.

In FIG. 11a, the pumping arrangement 26 is configured to remain/maintain a certain pressure in the cavities 21a, 22a, by means of the fluid communication line.

In some embodiments of the present disclosure, the gaskets 21, 22 and the fluid communication line 27 may be integrated in one single gasket arrangement extending around the VIG edge surface 7 and having sealed cavities 21a, 22a in over each outer major surface S1, S2 of the VIG unit.

As illustrated in FIGS. 10 and 11a, the pumping arrangement 26 may be an active, powered pumping arrangement that is powered by electrical energy from e.g. a battery, a thermoelectric power source and/or the like.

FIG. 11b illustrates an embodiment of the present disclosure where no active pumping arrangement is provided. Here, the fluid communication line 27 provides a pressure equalization functionality between the two gaskets 21, 22 so that when one of the gaskets are compressed due to e.g. thermal deflection of the VIG unit (see e.g. examples described later on in relation to e.g. FIGS. 12, 13 and/or 14-15), the other gasket is provided with fluid from the cavity of the compressed gasket through the fluid communication line 27. The gaskets hence functions as pumping arrangements for each other. The fluid system comprising the cavities 22a, 21a and the fluid communication line 27 may be a substantially closed system.

Figure 11C:
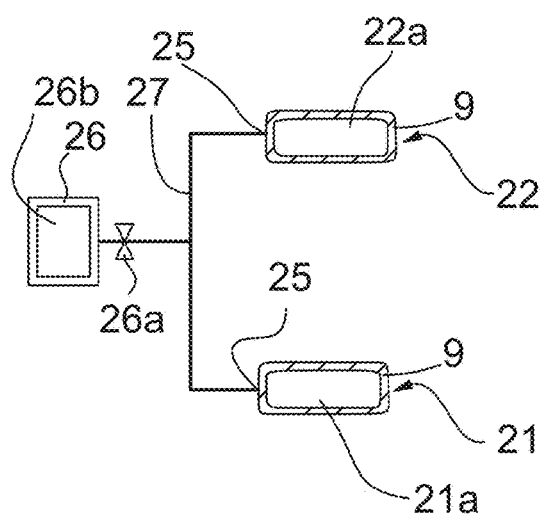

FIG. 11c illustrates an embodiment of the present disclosure wherein the pumping arrangement 26 is a passive pumping arrangement. The pumping arrangement here comprises a pressure container 26 with a cavity 26b comprising a fluid such as a gas, e.g. air, at an over pressure. The pressure container here acts as a fluid buffer. Here, a valve 26a is opened in order to increase the pressure in the gasket(s) 21, 22 in case the pressure drops. This may e.g. be provided dependent on pressure differences between the pressure in the gasket cavities 21a, 22a and the fluid buffer 26 which is external/separate to the gasket(s). This pressure difference may be determined by the valve 26a or another suitable pressure determination arrangement.

It is generally understood that the pumping arrangement in various embodiments of the present disclosure may comprise one or more one way over pressure release valves configured to let a fluid pass into the cavity 22a, 21a and/or out of the cavity dependent on the pressure in the cavities, in order to maintain the pressure in the cavity within a desired pressure interval. Though, variation in the fluid pressure in the cavity 21a, 22a over time may be allowed.

An active pump (not illustrated) may in further embodiments of the present disclosure be configured the provide further fluid to the pressure container in FIG. 26 so that the pressure in the fluid buffer will be maintained over time. Such an active pump may though in further embodiments be omitted in case the gaskets 21, 22 and/or the fluid pump are considered to be air tight enough to maintain an acceptable pressure in the cavities 22a, 22a over the lifetime of the VIG unit. Also or additionally, the pressure container may be replaced over time or comprise an inlet (e.g. connected to a one way valve—not illustrated) that allows a refilling of the fluid buffer.

In further embodiments of the present disclosure, the gasket 21, 22 may comprise an inlet connected to e.g. a one way valve or another valve solution that allows refilling the gasket cavity 21a, 22a. Here, the pumping arrangement 26 may be omitted.

In case the pumping arrangement 26 is an active pumping arrangement as e.g. illustrated in FIGS. 10 and 11a, the pumping arrangement 26 may be configured to be powered by a thermoelectric system or by means of a rechargeable battery (not illustrated). In case a rechargeable battery is used, the rechargeable battery may in further embodiments be configured to be recharged by means of a photovoltaic panel, such as a photovoltaic panel of the building aperture cover. In some window solutions such as roof windows, an actuator for opening and closing the window may already be battery powered and recharged by a photovoltaic panel, and in that case the pumping arrangement may be supplied with electric power from that battery. In other embodiments however, the battery and/or photovoltaic panel may be dedicated to the pumping arrangement alone and not shared with other systems.

In FIGS. 10 to 11c, the pumping arrangement 26 is external to all the flexible sealing gaskets 21m 22 of the aperture cover 1 and is connected to the cavity 21a, 21b of this or these gaskets 21, 22 by means of a fluid communication line 27. This may also be the case if the aperture cover 1 comprises only a single gasket 21 at one side of the VIG unit, see e.g. FIG. 6.

Figure 12:
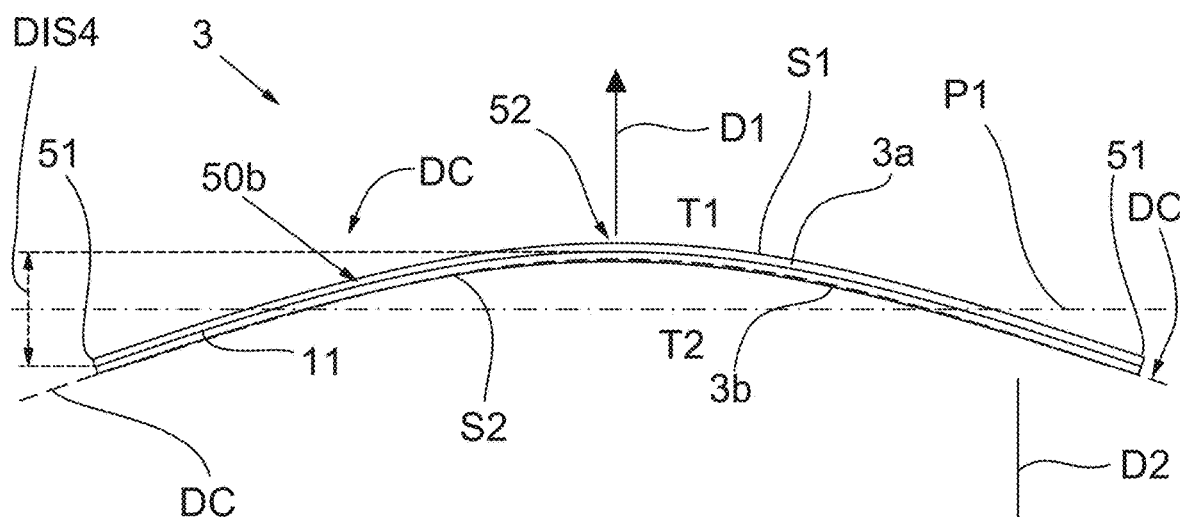

FIG. 12 illustrates schematically and seen from the side onto a long edge 50b, the thermal deflection of the edge 50b. As can be seen, the VIG unit edge 50b tends to describe a deflection curve DC due to thermal deflection of edge 50b, caused by a temperature difference $\Delta T=T1-T2$ between the two glass sheets 3a, 3b. In the present example, the glass sheet 3a is subjected to a higher temperature T1 than the glass sheet 3b which is subjected to temperature T2. This causes the glass sheet 3a to expand more than glass sheet 3b. As the edge seal 11 of the VIG unit may provide a very rigid connection between the glass sheets, e.g. in case it is a solder material such as glass frit based solder or metal based solder, this causes the VIG unit 3 to thermally deflect, so that the edges of the glass sheets 3a, 3b moves in the same direction, and this temperature difference causes the edge 50b to describe a deflection curve DC that varies relative to the plane P1. The deflection of the edge may vary dependent on the design of the VIG unit, but may be larger or lower dependent on the stiffness of the VIG unit.

It can be seen that the outer major surface S1 of the VIG unit 3 obtains a convex shape when a first temperature T1 is higher than temperature T2 at the other side of the VIG unit, whereas the outer surface S2 of the other (lower) glass sheet 3b (not visible in FIG. 10) provides a concave shape due to the thermal deflection since the edge seal is very rigid.

The VIG unit 1 deflects relative to the VIG unit plane P1 (determined where $\Delta T$ is substantially zero) and relative to the frame opening, in the directions D1, D2 which are perpendicular to the plane P1.

The outer, major surface S1 of the VIG unit 3 at or near the edge 50b, e.g. at the surface S1 opposite to the edge seal 3 thus obtains a convex shape when T1 is higher than T2 whereas the outer surface S2 of the other (lower) glass sheet 3b provides a concave shape.

As can be seen, the corners 51 of the VIG unit where the edge 8b terminates move in a direction D2 relative to the plane P1, whereas the centre portion 52 of the edge 50b, moves in the opposite direction D1 than the direction D2, relative to the plane P1. This is the case when the VIG unit is not fixed in the frame and is allowed to freely bend/deflect due to a temperature difference between 3a and 3b.

When/if the glass sheet 3b gets hotter than glass sheet 3a, caused by a temperature change of T1 and/or T2, the corners 51 of the VIG unit moves in the other direction D1 relative to the plane P1 and/or P2, and the centre portion 52 of the edge 50b, move in the direction D2, relative to the plane P1.

In one or more other embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit at a temperature difference $\Delta T=T1-T2$ of 0° C. is at least 2 mm, such as at least 3 mm or at least 4 mm, such as in the range of 2 mm to 30 mm, preferably in the range of 3 mm to 20 mm. This is in an un-constricted state where the VIG unit is allowed to freely bend. These numbers with regarding to DIS4 may also apply for a laminated VIG unit in embodiments of the present disclosure. The numbers with regarding to DIS4 may apply for a VIG unit having a surface area of the surfaces of above 0.8 m², such as at least 1.1 m², such as above 1.5 m². Here, it may be preferred that at least the longer edges 50a, 50b may be at least 0.8 meters in length, such as about or above one meter in length, for example at least 1.5 meter.

In some embodiments of the present disclosure, the total edge deflection DIS4 will be the sum of the largest distances of positions of the VIG unit edge in question from the plane P1 in each their direction D1, D2 from that plane. In FIG. 12, the largest total edge deflection DIS4 is defined between the deflection of the edge seal 11 at the centre 52 of the edge 50b, and the edge seal 11 at the corner 51 of the same edge, in a direction perpendicular to the plane P1.

In one or more embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit at a temperature difference $\Delta T$ of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative embodiments of the present disclosure, the largest total edge deflection DIS4 of any of the edges 50a-50d of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

Figure 13:
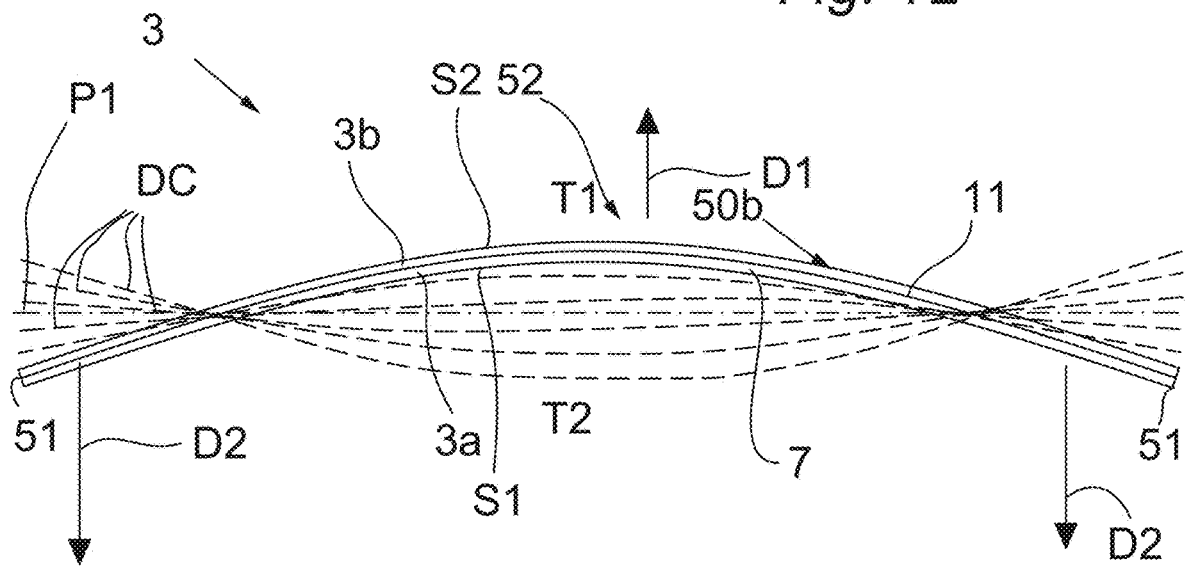

FIG. 13 illustrates schematically an example of a situation where a VIG unit 3 is subjected to a varying temperature difference ΔT=T1−T2 between the glass sheets 3a, 3b over time, according to embodiments of the present disclosure.

For example, it is common for e.g. building aperture covers such as windows or doors arranged in openings of outer walls, roofs or the like of a building, that these are subjected to varying temperature differences over time after they have been installed.

For example, with a general room temperature T1 of e.g. about 20° C. in the building, the temperature T2 at the other side (outside a building) of the VIG unit 3 may vary significantly, such as between e.g. 15° C. and 30° C. or even more, over 24 hours.

Even, the temperature difference ΔT=T1−T2 may so to say switch "operational sign" so that the hotter side of the VIG unit 3 may shift one or more times over e.g. 24 hours, many times over a calendar year, or even in the case that a hail, rain or snow shower occurs for a short period of time. This may largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference ΔT to switch operational sign: The temperature T1 is 20° C. at the inside, and T2 (outside) is 10° C. at 8 PM. Thus, the VIG unit edge 50b corners 51 deflect in the direction D2 as illustrated in FIG. 13. Then the thermal deflection of the VIG unit edge 50b gradually changes (illustrated by dashed, envisaged deflection curves DC) as the temperature T2 changes to be 35° C. at 3 AM at surface 4b, and thus 15° C. higher than T1. Thus, the VIG unit thermal deflection changes so that the edges 5a0-50d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection/edge deflection curve DC of the VIG unit 3 may vary significantly over 24 hours and even more over a longer period such as a calendar year and may depend on different weather conditions. This causes varying stress condition on the VIG unit over time, such as at the edges 50a-50d near the location where the VIG unit glass sheets are connected to seal the evacuated gap by e.g. an edge sealing 11. The stress conditions are complex. Examples of these stresses may be shear stresses at the VIG edge, differential stresses where tensile stress occurs at the deflecting glasses and/or stress concentrations at the corners.

Even more extreme temperature conditions may appear in cases where the VIG unit 3 is installed in a frame of a roof window, see e.g. FIG. 3 or 4.

Figure 14:
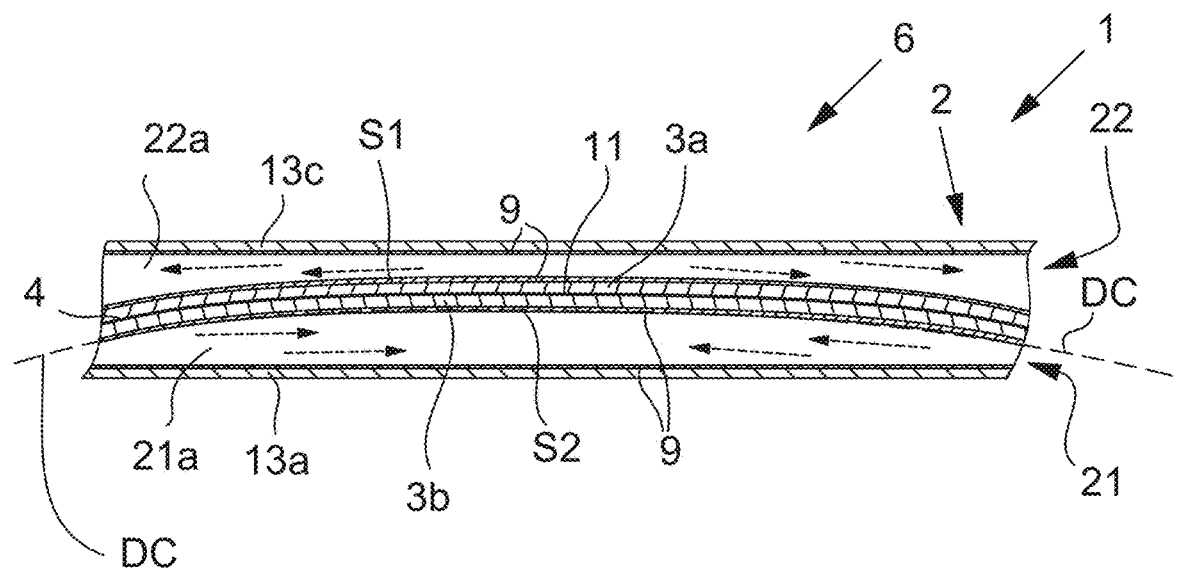

FIG. 14 illustrates schematically a cross sectional view according to embodiments of the present disclosure, where the VIG unit 3 is arranged in the building aperture cover 1 and subjected to thermal deflection as e.g. explained in relation to FIGS. 12 and 13. As can be seen, the glass sheet 3a provides a convex shape and thus moves towards the wall 13c. This causes a compression of the gasket 22 around the centre area of the VIG unit edge as the VIG unit moves towards the frame part 13c. This cause a displacement of the fluid in the cavity 22a rom the centre area and towards the corner areas of the VIG unit as illustrated by the dashed arrows. In a similar way, the fluid at the other gasket 21 is forced from the corner areas of the VIG edge and towards the centre area, thereby helping to adapt the gaskets to the shape of the VIG caused by the thermal deflection of the VIG edge.

Figure 15:
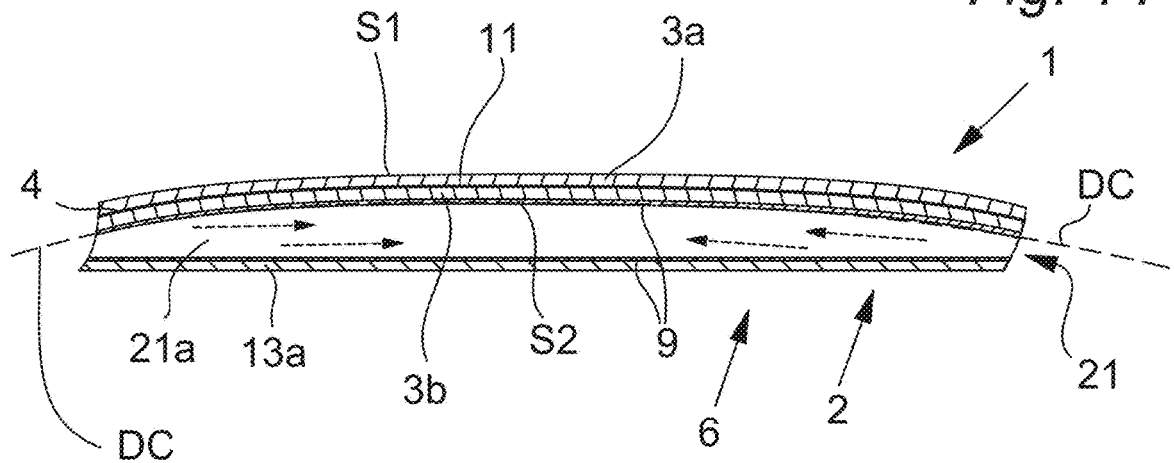

FIG. 15 illustrates schematically a cross sectional view according to embodiments of the present disclosure as in FIG. 14, but where the surface S1 of the VIG unit is exposed and may be substantially uncovered by the frame at the position opposite to the gasket 21. Mechanical fixation means and/or adhesives such as structural adhesive (see e.g. FIG. 6) for fixating the VIG unit in the frame such as a sash 6 is though not illustrated in FIG. 15. Here it can also be seen that the fluid in the cavity 21a of the gasket is moved around according to the thermal deflection of the VIG unit, in the present solution by the corner areas pressing the fluid towards the centre area of the VIG edge due to that the surface S1 is hotter than surface S2.

Accordingly, both in FIGS. 14 and 15, the edges of the vacuum insulated glass unit 1 is configured to deflect when subjected to a temperature difference between the first and the second glass sheet. As a result thereof, the flexible sealing gasket is configured to follow and accommodate the movement of the vacuum insulated glass unit when the edges of the vacuum insulated glass unit deflects and describes a deflection curve DC due to the temperature difference as the VIG unit displaces the fluid in the sealed cavity 21a, 22a.

Figure 16:
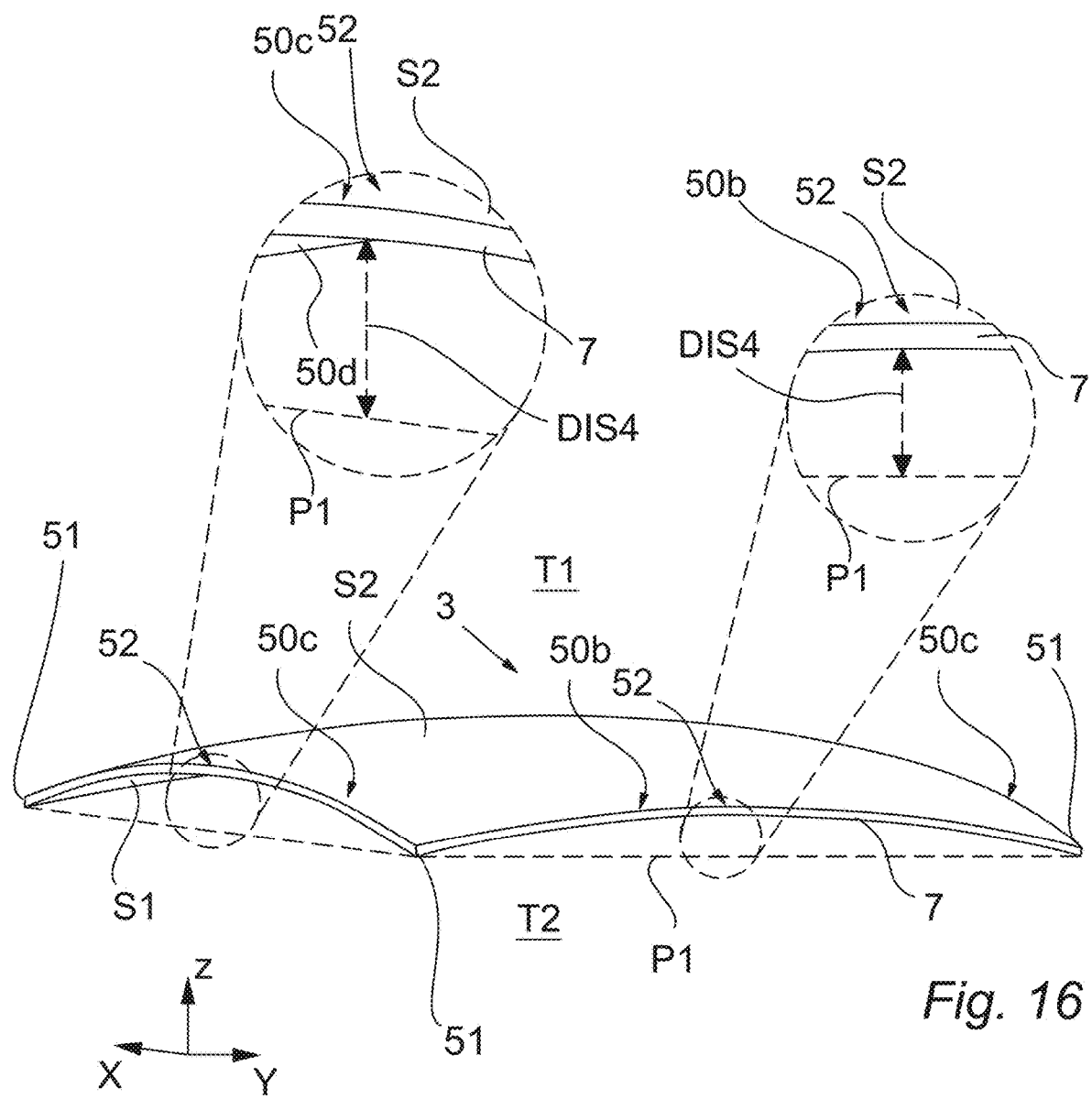

FIG. 16 illustrates a visualized computer simulation of a "free" thermal deflection of a rectangular VIG unit 3 (seen in perspective) that may be used for a frame 2 according to embodiments of the present disclosure, which has been provided by one of the present inventors. The VIG unit 3 simulated was based on a VIG unit model defined to have the following characteristics:

The VIG unit is laminated and hence comprises a lamination glass and a lamination interlayer Length L1 of shorter edges 50c 50d: 114 cm Length of the longer edges 50a, 50b: 140 cm Glass sheets 3a, 3b Thermally tempered glass sheets each having a thickness of 4 mm.

Lamination glass: annealed float glass of a thickness of 4 mm

Edge seal 11 material: solder glass edge seal material

The VIG is arranged with the surfaces S1, S2 horizontally (when the temperature difference ΔT=T1−T2 is 0° C.) and is thus simulated so that gravity acts on the VIG unit.

Temperature difference between T1 and T2: about 60° C.

The hotter side (S2) was set to be the lamination glass side and hence the lamination glass sheet provides the outer major surface S2 in FIG. 15.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 50b would be 7.82 mm from the plane P1 (DIS4). Moreover, under these conditions, the simulation results defined that the distance DIS4 from the centre part 52 of the shorter edge 50c would be 5.15 mm from the plane P1.

Figure 17:
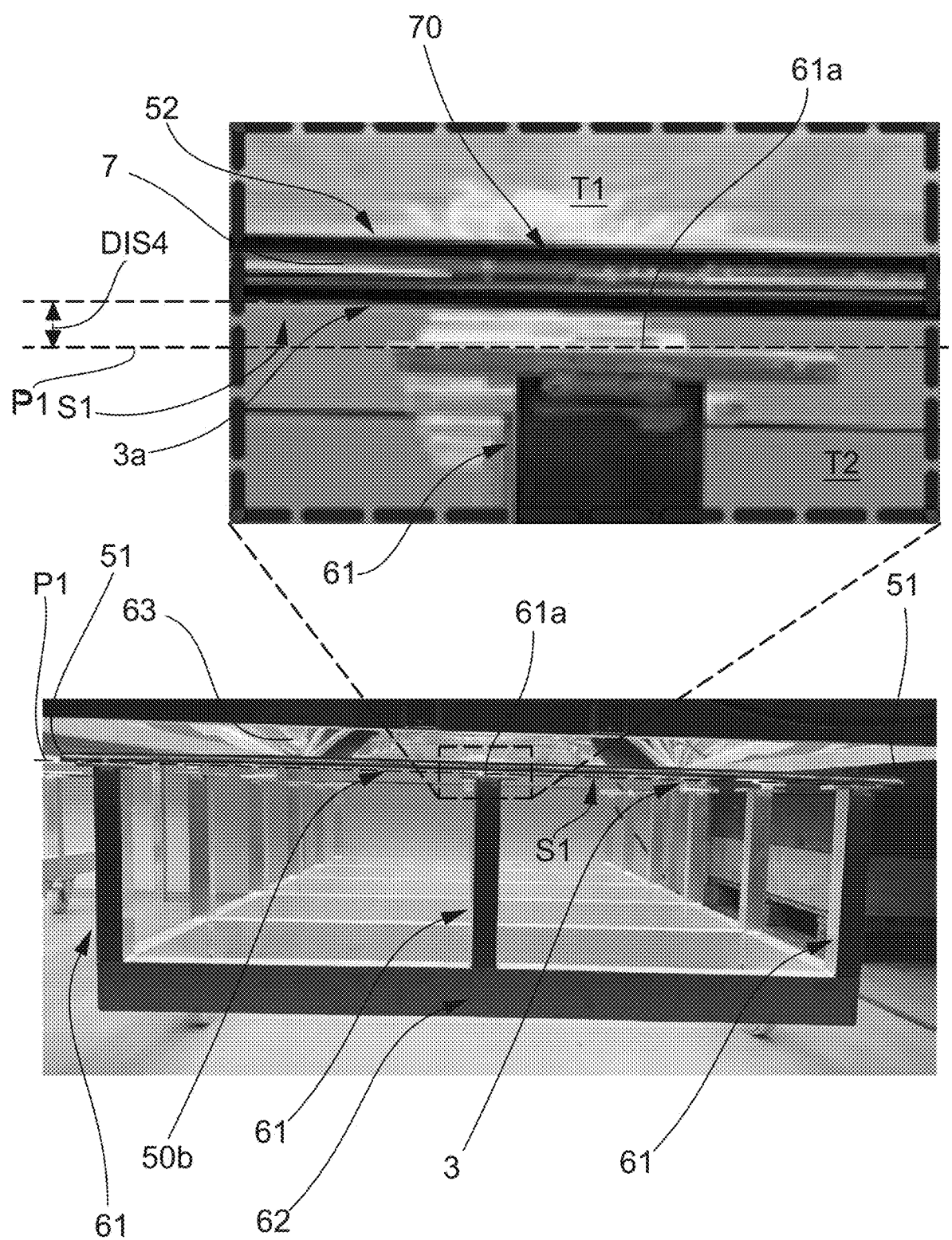
Figure 18:
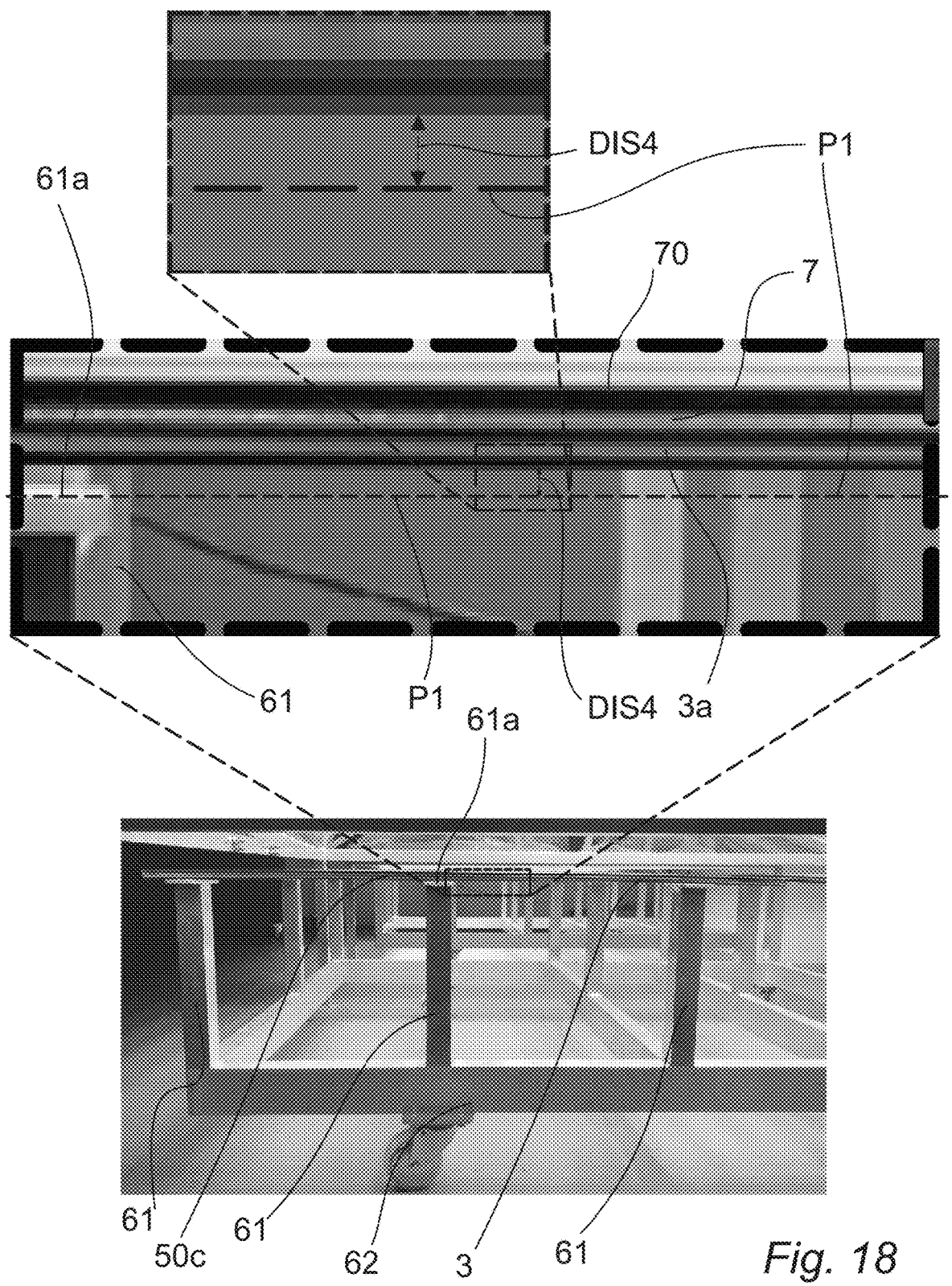

FIGS. 17 and 18 are images of a test of a thermal deflection of a laminated VIG unit 3 having substantially the parameters as defined above with regard to FIG. 16. The VIG unit 3 was placed horizontally to support on support surfaces 61a of a plurality of support rods 61 of a support frame 60.

An infrared heat radiation arrangement 63 was arranged above the upper glass sheet, i.e. the lamination glass sheet, and covered the upper glass sheet to a bit beyond the side surfaces 7 of the VIG unit 3. Then the heating arrangement 63 started to heat the upper glass sheet 70 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference $\Delta T=T1-T2$, when compared to the temperature difference $\Delta T=T1-T2$ of substantially 0° C. The distance DIS4 was determined by a first reference point defined by a support surface 61a (that was used as a reference for the plane P1), and the lower surface of the VIG unit 3, in a direction substantially perpendicular to the plane P1.

The maximum edge deflection DIS4 of the long edge 50b (FIG. 16) was measured to be approximately 7.4, or more precisely 7.43 mm at the forced temperature difference, when compared to the temperature difference $\Delta T=T1-T2$ of substantially 0° C.

FIG. 18 illustrates the edge deflection of the shorter edge 50c of the same VIG unit as tested in FIG. 17. Here, in a similar way, the shorter edge 50c described an edge deflection curve DC due to the forced heating and the temperature difference between T1 and T2. Additionally, the maximum edge deflection DIS4 of the edge 50c was measured to be approximately 5.3 mm, or more precisely 5.33 mm, at the forced temperature difference, when compared to the temperature difference $\Delta T=T1-T2$ of substantially 0° C.

Accordingly the maximum tested edge deflection DIS4 vs the simulated edge deflection resulted in the values of table 1 below.

TABLE 1

| | Simulated edge deflection DIS4 | Edge deflection test (FIGS. 15-16) DIS4 |
|---|---|---|
| Longer edge 50b | 7.82 mm | 7.43 mm |
| Shorter edge 50c | 5.15 mm | 5.33 mm |

The inventors concluded that the test illustrated in FIGS. 17-18 validated the computer simulations, and thus confirmed that the VIG unit computer simulations was sufficiently precise and reliable.

Additionally, the test approved that the edges of larger size laminated VIG units having rigid edge seals 11 provided by fused edge seal material such as solder glass or a metal solder, when subjected to a larger temperature difference, will tend to provide/describe an edge deflection curve/arc DC that causes a substantial edge deflection DIS4 in an un-constricted situation where no "outer" mechanical forces constrains the edge deflection. This also applies in laminated VG units and in VIG units without a laminated sheet.

Figure 19:
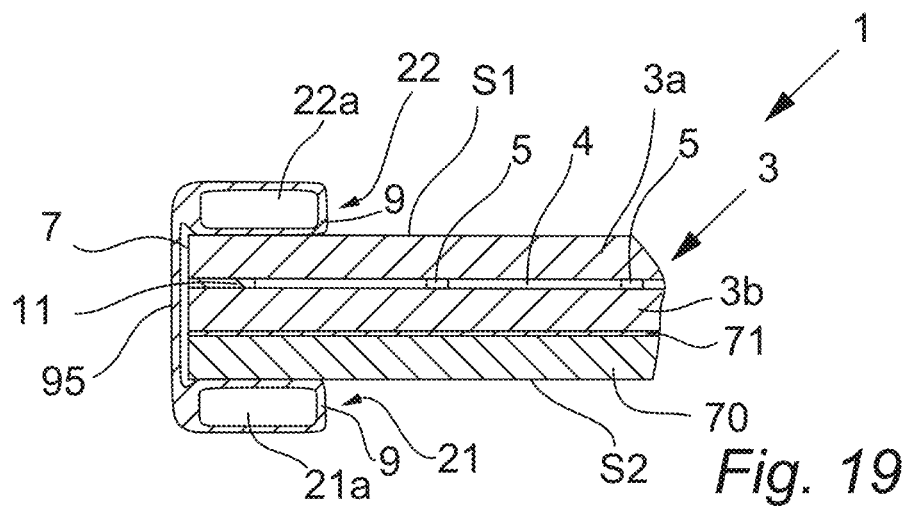

FIG. 19 illustrates schematically and embodiment of the present disclosure (frame arrangement 2 has been omitted for drawing simplicity) where the gaskets 21, 22 are part of the same gasket arrangement and comprises a gasket connection part 95 in the form of a flexible wall part made form substantially the same material as the gasket walls 9, the gasket connection part 95 extends around the edge surface 7 and hence connects the two gaskets 21, 22. When installing the gaskets 21, 22, the gaskets arrangement may hence be folded around the edge surface 7. In other embodiments of the present disclosure the gaskets at the opposing outer major surfaces may be completely separated and not mechanically connected as illustrated in several of the figures described above.

Figure 20:
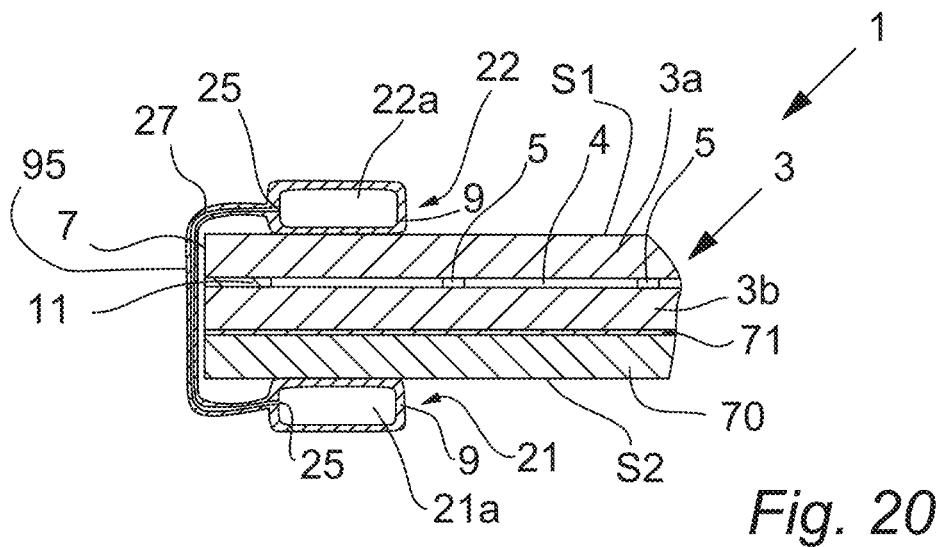

FIG. 20 illustrates an embodiment of the present disclosure where the previously described fluid communication line 27 may be embedded/incorporated in the gasket connection part 95.

Figures 21A, 21B:
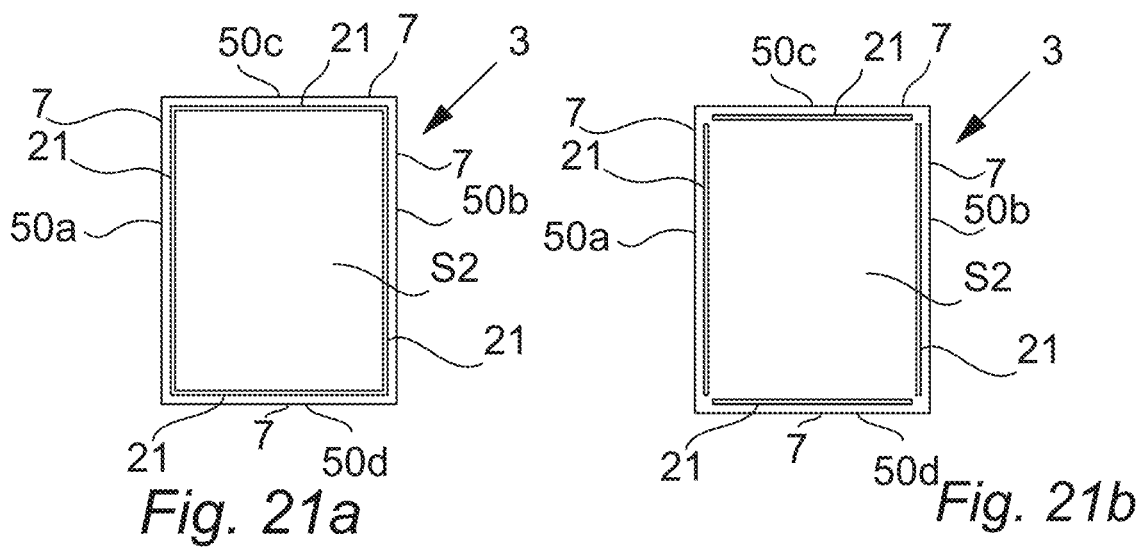

FIG. 21a illustrates an embodiment of the present disclosure wherein the gasket 21 (it may also be the gasket 22 in further embodiments of the present disclosure) where the gaskets 21 extending along the respective VIG edges 50a, 50d are interconnected. The gasket 21 extending along edge 50a may thus be in fluid communication with gasket 21 extending along edge 50c and/or 50d and so on. A pumping arrangement 26 (not illustrated in FIG. 21a, see previous description) may thus in further embodiments be connected to the gaskets by a single or a few fluid communication lines in order to adjust the pressure in the gasket at the VIG edges 50a-50d. In other embodiments, the gaskets extending along the edges 50a-50d may be connected mechanically but not be in fluid communication.

FIG. 21b illustrates an embodiment of the present disclosure wherein individual gaskets 21 that are not mechanically connected to each other are placed along each their respective edges 50a-50d.

Figure 22:
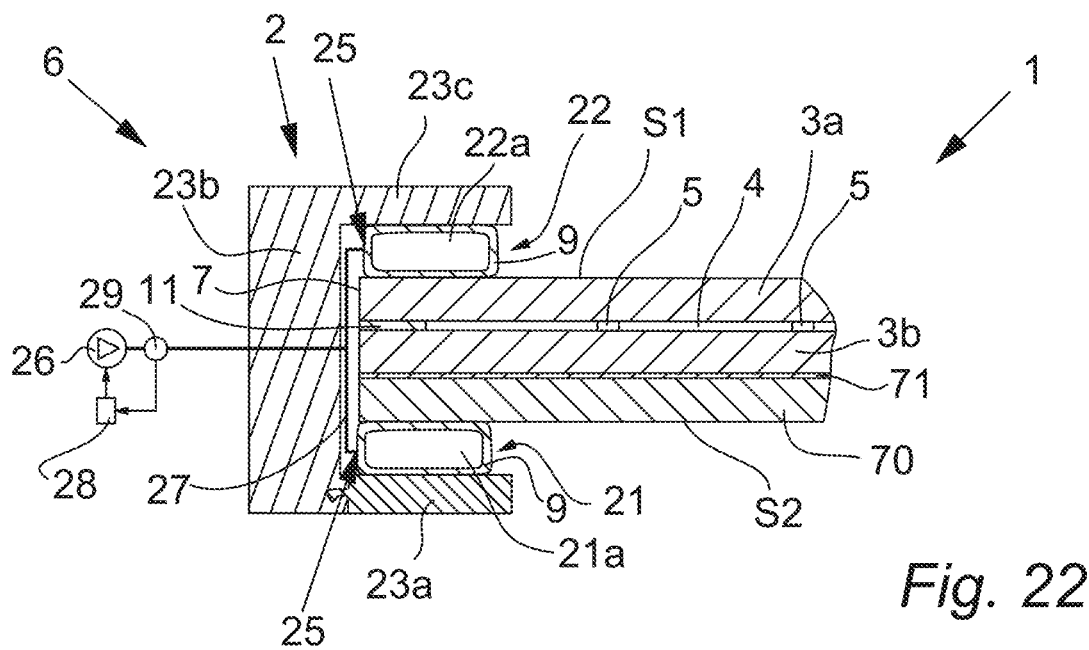

FIG. 22 illustrates an embodiment of the present disclosure where the pumping arrangement 26 is arranged external to the frame arrangement 2. The gasket solution 21, 22 substantially corresponds to the solution illustrated in FIG. 10. However, in FIG. 22, the pumping arrangement 26 is placed away from/the frame arrangement and not incorporated in the frame arrangement. Here, the pumping arrangement 26 may be connected to the gasket(s) 21, 22 by means of a fluid communication line as illustrated. The pressure determination arrangement 29 may as illustrated also in embodiments of the present disclosure be arranged away from the frame arrangement 2, and the same may in still further embodiments of the present disclosure be the case for the pressure control arrangement 28.

The above disclosure is generally described as relating to a building aperture cover in the form of architectural aperture coverings, more particular in the form of window solutions. It is generally understood that these window solutions may e.g. be for vertical windows where the VIG unit is arranged with a plane P1 arranged with an angle of substantially 90° compared to horizontal. In further aspects of the present disclosure, the window is a roof window (see FIGS. 3 and 4) where the VIG unit 3 is arranged with an angle different from vertical, for example where the plane P1 is arranged with an angle between 5° and 90°, such as between 10° and 75° or 5° and 85°, compared to horizontal, or substantially completely horizontally. It is however understood that the solutions disclosed above may also be used in architectural aperture coverings in the form of doors comprising windows.

In further embodiments of the present disclosure, the VIG unit frame 2 solutions disclosed in this document may be used as architectural aperture coverings in or as curtain walls.

In the examples described above and illustrated in the figures, only one flexible gasket 21, 22 with a sealed cavity is placed at a side of the VIG unit 3. Though it is understood that in further embodiments of the present disclosure (not illustrated), a plurality of separate flexible gaskets 21, 22 with sealed cavities, such as two to four separate flexible gaskets 21, 22, may be arranged on one of the sides S1, S2 or each of both sides S1, S2 of the VIG unit. They 21, 22 may in further embodiments of the present disclosure be controlled separately by a pumping arrangement such as so as to optimize reduced stress on the VIG unit 3.

Figure 23:
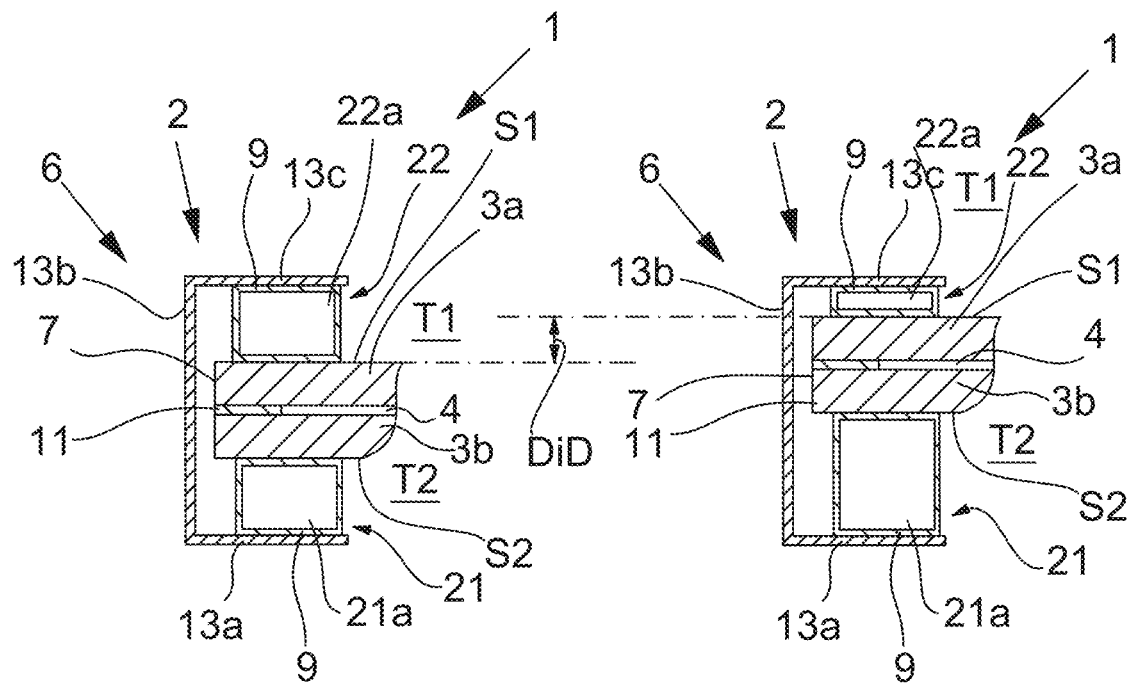

FIG. 23 illustrates a cross sectional view of a displacement distance of the sealing gasket(s) according to embodiments of the present disclosure, caused by a temperature difference $\Delta T=T1-T2$ between the outer major surfaces S1, S2 of the vacuum insulated glass unit. The cross sectional view may be a cross sectional view of about the middle of the VIG unit edge 7.

In the leftmost example of FIG. 23, Temperature T1 is substantially equal to T2 ($\Delta T=0$), hence providing substantially no deflection of the sealing gaskets 21, 22 due to thermal deflection of the VIG unit edge.

However, in the rightmost example of FIG. 23, a temperature difference $\Delta T=T1-T2$ has occurred, and the VIG unit edge has deflected as a result thereof, e.g. as previously described. The rightmost example may hence substantially correspond to a scenario as illustrated in FIG. 14.

The VIG deflection provides that the elongated flexible sealing gaskets 21, 22 are displaced with a displacement distance DiD due to the deflection of the VIG unit caused by the temperature difference T1-T2. This displacement distance DiD may be the maximum displacement distance caused by the VIG unit edge deflection of a seal 21, 22. E.g. determined at the middle/centre of the longest edge of a VIG unit, or at or near a corner portion of the VIG unit.

The displacement distance DiD may in embodiments at least correspond to or be larger than the thickness of one of the glass sheets 3a, 3b of the vacuum insulated glass unit. Additionally or alternatively, in embodiments of the present disclosure, the displacement distance DiD may at least correspond to or be larger than least 20%, such as at least 50%, such as at least 70% of the thickness of the vacuum insulated glass unit. The temperature difference $\Delta T=T1-T2$ may at least be 30° C., such as about 40° C. to provide the above edge deflection causing the displacement distance DiD.

As can be seen, one of the seals 21 is compressed with the displacement distance DiD, whereas the second seal 21 expands/enlarges at the same location of the VIG unit corresponding to the displacement distance DiD.

In general, it is understood that the building aperture cover 1, such as a window, for example a roof window, according to embodiments of the present disclosure as described in this document, may be manufactured at a manufacturing facility by a manufacturer of the window covering device, and subsequently transported to an installation site for installation at a building.

In other embodiments of the present disclosure the building aperture cover 1, such as a window, for example a roof window, according to embodiments of the present disclosure as described in this document may be the result of a retrofitting operation where a building aperture cover frame arrangement 2, 6 originally configured to comprise a gas filled insulated glass units is reused for installation of the vacuum insulated glass unit and the one or more elongated flexible sealing gaskets 21, 22.

The retrofitting method may comprise removing a glass unit (not illustrated) of a building aperture cover such as a window, for example a roof window, from a frame arrangement 2, 6, 35. The glass unit to be removed may e.g. comprise one or more gas (such as argon or another suitable gas, e.g. an inert gas) filled cavities providing heat insulation and may also be referred to as insulated glass unit. Then a VIG unit as e.g. previously described is provided and arranged in the frame arrangement 2, 6, such as a sash. During the retrofitting, one or more elongated flexible sealing gaskets are provided. This/these 21,22 are arranged between an outer major surface S1, S2 of the vacuum insulated glass unit 3 and a frame part 13a, 13c, 23a, 23c of the frame arrangement 2, 6, so that the one or more elongated flexible sealing gaskets 21, 22 extends substantially parallel to an edge 7, 50a-50d of the vacuum insulated glass unit 3. The one or more elongated flexible sealing gaskets 21, 22 comprises an interior, sealed cavity 21a, 22a configured to comprise a pressurized fluid as e.g. described previously.

The thickness of the removed gas filled unit may be larger than the thickness of the VIG unit, thereby providing an space to be used for the one or more elongated flexible sealing gaskets 21, 22. It is generally understood that the retrofitting operation may be provided in order to obtain a building aperture cover such as a window, for example a roof window, comprising a vacuum insulated glass unit 3 and one or more elongated flexible sealing gaskets 21, 22 that will be compressed and/or expand as a consequence of that the vacuum insulated glass unit deflects due to temperature changes $\Delta T=T1-T2$.

The thickness of the glass unit to be removed during the retrofitting may in embodiments of the present disclosure be larger than the thickness of the vacuum insulated glass unit 3 (measured between the outer major surfaces S1, S2 as previously described) to be installed in the frame arrangement 2, 6. For example, the thickness of the glass unit to be removed may be at least 30% such as at least 50%, e.g. at least 90% larger than the thickness of the vacuum insulated glass unit 3 to be installed in the frame arrangement 2, 6. In some embodiments, the thickness of the glass unit to be removed may be more than double the thickness of the vacuum insulated glass unit 3 to be installed in the frame arrangement 2, 6. The thickness difference may e.g. be provided due to that the evacuated gap 4 thickness may be significantly smaller than the thickness of the gap(s) of the removed insulated glass unit, such as at least 20 or at least 30 times, such as at least 40 times smaller than the gap thickness in the removed insulated glass unit.

Figure 24:
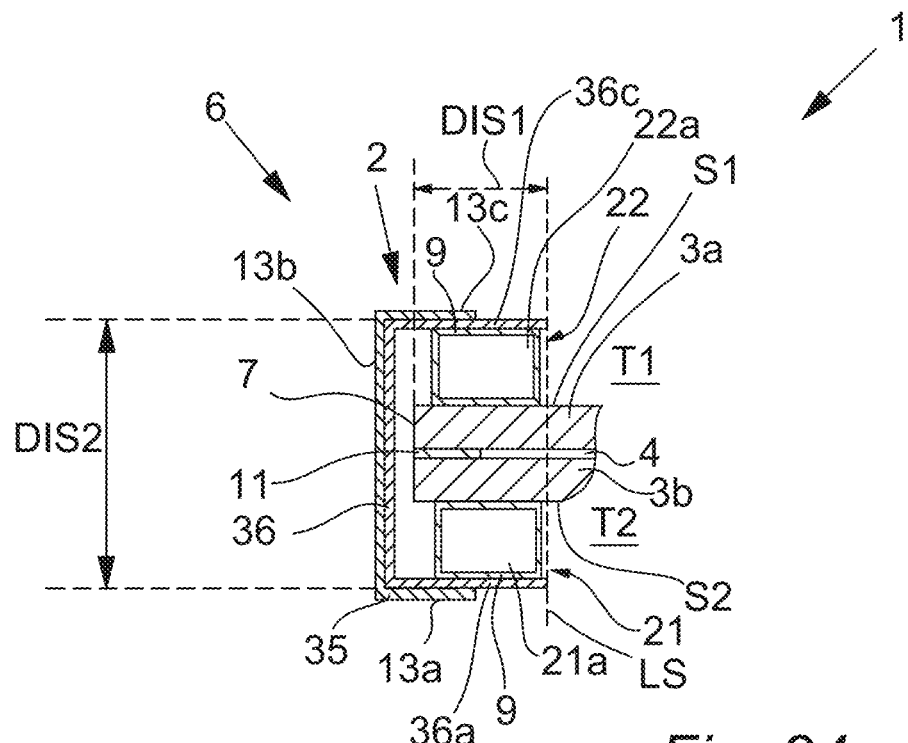

FIG. 24 illustrates an embodiment of the present disclosure where an existing window frame 35 has been retrofitted to hold a VIG unit in accordance with the present disclosure. Here, a retrofitting frame profile 36 is provided, and the seal or seals 21, 22 is placed between a wall of this profile 36 and the outer major surface S1, S2 of the VIG unit 3. This may be done already before the retrofitting operation is initiated, and the VIG unit may e.g. be preassembled/fitted with the seal(s) 21, 22 and the profile 36 from the manufacturer so that the VIG unit 3, the profile(s) 36 (around the edges of the VIG unit) and the seal(s) 21, 22 are delivered as a single unit to the retrofitting site. Hence, by attaching the retrofitting profile 36 to the original/existing frame 35, such as between the walls 13a, 13c, after the old window pane is removed, this provides that the one or more elongated flexible sealing gaskets 21, 22 is/are placed between an outer major surface S1, S2 of the vacuum insulated glass unit 3 and a frame part of the frame arrangement 2, 6, i.e. the wall part of the profile 36, at least. The gasket 21, 22 may also be arranged to be opposite to a wall part of the frame 13a, 13c, so that this wall part of the frame is placed opposite to a part of a major surface S1, S2 of the VIG unit. Thereby, the one or more elongated flexible sealing gaskets 21, 22 will extend substantially parallel to an edge 7 of the vacuum insulated glass unit 3. It is understood that retrofitting profiles 36 and gaskets 21, 22 may be arranged along a plurality of edges, such as all edges of the VIG unit.

In embodiments of the present disclosure, the retrofitting profile may be made from or comprise a material such as metal, e.g. steel or aluminium, a plastic/polymer material or a fibre reinforced material such as a carbon fibre or glass fibre reinforced wall material, e.g. a polymer, that may have been extruded or pultruded. The retrofitting profile may comprise a single walled construction as illustrated, e.g. made from a plate shaped material, or may comprise one or more cavities therein, which may e.g. provide e.g. heat insulation.

The sealing gaskets 21, 22 may in some embodiments of the present disclosure be inflated after the VIG unit is installed in the frame, during the retrofitting process, in other embodiments, the sealing gaskets may be inflated with the fluid prior to the retrofitting process.

It is understood that in some embodiments of the present disclosure, the walls of the retrofitting profile 36 may extend with a larger distance (see previously described "DIS1" above) in over the major surface(s) S1, S2 of the VIG unit than the walls 13a, 13c, 23a, 23c of the existing frame extends in over the major surfaces of the VIG unit. This may be provided in order to reduce condensation issues near the edges of the VIG unit due to the edge sealing 11 providing a thermal bridge. Hence, the effective window/sash opening size through which light may pass through the VIG unit after installation in the existing frame 35, may be reduced compared to the effective window/sash opening size of the window before the original insulated glass unit was removed.

Figure 25:
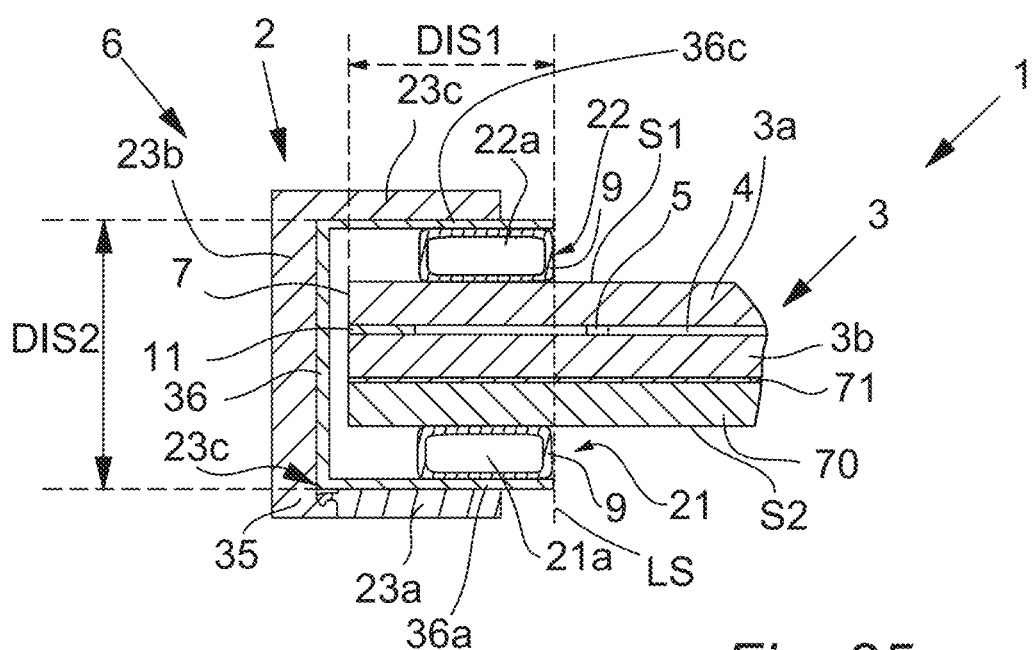

FIG. 25 illustrates a retrofitting solution where the existing frame comprises the wall parts 23c (opposite to a major surface of the VIG) and 23b (opposite to the edge 7), and a glazing member 23a opposite to the other major surface of the VIG 3. The glazing member is attached to the base member by a connection system 23c such as a latch- and notch connection, but other connection systems may additionally or alternatively be used. Here, the glazing member/profile 23a of the relevant frame profiles may be removed/disconnected from the remaining part of the existing frame, as conventionally provided in case the original insulated glass sheet should be replaced. Then, the retrofitting profile 36 is placed in the recessed portion of the frame when the original/old insulated glass unit is removed. This removed glass unit leaves enough space to place the retrofitting profile 36 in this space, and the glazing member 23a can then be attached to the remaining part of the frame again, e.g. by means of the connection system 23c.

As can be seen in FIGS. 24 and 25 as well as several of the previous figures, the frame wall parts 13a, 13b, or 23a, 23c, together with the end wall part 13b or 23b, provides a U-shape profile of the existing frame 35, thereby providing a space for receiving the insulated glass unit edge 7. The width DIS2 of this space provided walls 23a and 23c may in embodiments of the present disclosure be between 15 mm and 80 mm, such as between 20 mm and 50 mm, at least in a frame used for retrofitting. The size of the width DIS2 may be dependent on if the "regular" insulated glass unit is a double or triple glazing (IGU) with just one insulating space, or more insulating spaces separated by an intermediate glass sheet. The latter may be thicker than a double IGU, hence requiring the distance/width DIS2 to be larger.

In FIGS. 24 and 25, the width of the retrofitting profile 36 substantially corresponds to the distance/width DIS2, and the walls 36c, 36a substantially abuts the walls 13a, 13c (FIG. 24) or 23a, 23c (FIG. 25). However, in some embodiments, the retrofitting profile 36 width may be smaller than the distance/width DIS2, which may be handled by e.g. providing a sealing strip (not illustrated), such as a resilient sealing strip made from a rubber material, silicone material or the like between the walls 36c, 23c and/or between the walls 36c, 23c to seal a potential gap between these walls caused the width of the retrofitting profile being smaller than the distance/width DIS2.

The walls 36a, 36c are placed at opposite sides of the VIG unit 3, and opposite to each their major surface S1, S2 of the VIG unit.

In some embodiments the glazing member 23, if present, may be replaced with another glazing member 23 providing a larger or reduced distance/width DIS2, to obtain a distance/width DIS2 that may fit the retrofitting profile 36 width. Here it is understood that it may be a desire to provide the above mentioned sealing strip, and that the new glazing member/profile accordingly will be adapted to allow a proper sealing strip to be provided between the retrofitting profile and the existing frame 35 at one or both sides of the retrofitting profile 36.

It is generally understood that the retrofitting profile 36 may be considered a part of the overall frame arrangement 2, 6, and an "add on frame part" to the existing frame arrangement.

In some embodiments, a gap (not illustrated) may be provided or allowed between the wall 36b of the retrofitting profile and the wall 13b or 23b of the existing frame. In other embodiments, these walls may as illustrated in FIGS. 24 and 25 touch. It is understood that the retrofitting profile 36 may moreover be supplied with e.g. recesses 19 as e.g. previously described, see e.g. FIGS. 6, 8 and 9 and the description thereto.

Additionally or alternatively, the seal(s) 21, 22 may be attached to a wall 36a, 36c of the retrofitting profile and a surface S1, S2 of the VIG unit by means of an adhesive, e.g. as previously described.

Additionally or alternatively, a further, flexible sealing strip (not illustrated in FIGS. 24-25), such as a rubber and/or foam seal may be provided between a wall 36a, 36c of the retrofitting profile 36 and a surface S1, S2 of the VIG unit by means of an adhesive, e.g. as previously described, e.g. arranged closer to the line of sight LS than the seal(s) 21, 22. This may e.g. provide that the seal(s) 21, 22 is/are hidden in the interior of the retrofitting profile 36 and not visible to the human eye upon normal use of the VIG unit and building aperture cover 1 after installation of the VIG unit in the existing frame 35. Such a further, flexible sealing strip may also be provided in a solution according to the present disclosure but which is not the result of a retrofitting process, but instead a new window aperture cover provided at a manufacturing site.

It is generally to be understood that e.g. a pumping arrangement 26 as e.g. previously described may be provided during the retrofitting, e.g. embedded in the retrofitting profile 36 if present, or in the existing frame or attached thereto. The interior cavities 21a, 21b of the seals 21, 22, if more than one is to be provided, may or may not be in fluid communication as e.g. previously described. That is both the case if a retrofitting profile 36 is provided or is omitted and the VIG unit, seal(s) 21, 22 with a cavity 21a, 21b are then to be installed directly in the frame, e.g. with proper further seals or the like if considered relevant.

Generally it is to be understood that the retrofitting method according to the present disclosure may provide a solution substantially as described previously in accordance with one or more of the figures such as one or more of FIGS. 1-11c, 14, 15, 19-23, and/or embodiments described in relation thereto. However, in some embodiments with a retrofitting profile 36 present too, but this profile 36 may as mentioned above also be omitted.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A building aperture cover comprising
a frame arrangement;
a vacuum insulated glass unit arranged in the frame arrangement and comprising an evacuated gap placed between a first and a second glass sheet, and a plurality of support structures arranged in the evacuated gap;
elongated flexible sealing gaskets arranged between an outer major surface of the vacuum insulated glass unit and a frame part of the frame arrangement;
wherein the elongated flexible sealing gaskets are arranged to extend substantially parallel to an edge of the vacuum insulated glass unit
wherein the elongated flexible sealing gaskets comprise
a first flexible sealing gasket comprising an interior, sealed cavity configured to comprise a pressurized fluid, where the first flexible sealing gasket is arranged between a first frame part of the frame arrangement and an outer major surface of the vacuum insulated glass unit, and
a second flexible sealing gasket comprising an interior, sealed cavity configured to comprise a pressurized fluid, where the second flexible sealing gasket is arranged between a second frame part of the frame arrangement and another opposite outer major surface of the vacuum insulated glass unit.

2. The building aperture cover according to claim 1, wherein the edges of the vacuum insulated glass unit are configured to deflect when subjected to a temperature difference between the first and the second glass sheet, and wherein said flexible sealing gasket is configured to follow the movement of the vacuum insulated glass unit when the edges of the vacuum insulated glass unit deflects due to said temperature difference.

3. The building aperture cover according to claim 1, wherein said fluid in the cavity is a gas.

4. The building aperture cover according to claim 1, wherein the flexible sealing gasket abuts an outer surface of the vacuum insulated glass unit.

5. The building aperture cover according to claim 1, wherein the cavities of the first and second said flexible sealing gaskets are configured to be in fluid communication with each other.

6. The building aperture cover according to claim 1, wherein the pressure in the cavity is higher than the ambient air pressure.

7. The building aperture cover according to claim 1, wherein the wall material of the one or more flexible sealing gaskets comprises an elastomer.

8. The building aperture cover according to claim 1, wherein an adhesive is arranged to fixate the vacuum insulated glass unit to the frame arrangement and wherein the flexible sealing gasket is arranged at the same side of the vacuum insulated glass unit as said adhesive.

9. The building aperture cover according to claim 1, wherein the flexible sealing gasket comprises an inlet to the cavity and is configured to be inflated by means of a pumping arrangement arranged to be in fluid communication with the inlet.

10. The building aperture cover according to claim 1, wherein two or more edges of the vacuum insulated glass unit has a length that is at least one 0.8 meter.

11. The building aperture cover according to claim 1, wherein the pressure in the cavity at a temperature of 20° C. is between 0.5% and 50% larger than the ambient atmospheric pressure.

12. The building aperture cover according to claim 1, wherein the evacuated gap has a thickness/width below 1 mm wherein a Uglazing value of the vacuum insulated glass unit is below 0.9 W/(m^2 k), wherein an edge seal seals the evacuated gap between the first and second glass sheets, and wherein said edge seal is or comprises a fused edge seal.

13. The building aperture cover according to claim 1, wherein said one or more elongated flexible sealing gaskets is/are configured to displace with a displacement distance of at least the thickness of one of said glass sheets of the vacuum insulated glass unit due to a deflection of the vacuum insulated glass unit caused by a temperature difference between the first and the second glass sheet, and wherein said temperature difference is at least 30° C.

14. The building aperture cover according to claim 1, wherein said one or more elongated flexible sealing gaskets is/are configured to displace with a displacement distance corresponding to at least 20% of the thickness of the vacuum insulated glass unit due to a deflection of the vacuum insulated glass unit caused by a temperature difference between the first and the second glass sheet and wherein said temperature difference is at least 30° C.

15. A method of retrofitting a building aperture cover to comprise a vacuum insulated glass unit, wherein the method comprises the steps of:
 removing an insulated glass unit of a building aperture cover from an existing frame arrangement,
 providing a vacuum insulated glass unit comprising an evacuated gap placed between a first and a second glass sheet, and wherein a plurality of support structures are arranged in the evacuated gap,
 arranging the vacuum insulated glass unit in said existing frame arrangement, and
 placing elongated flexible sealing gaskets between an outer major surface of the vacuum insulated glass unit and a frame part, so that the elongated flexible sealing gaskets extend substantially parallel to an edge of the vacuum insulated glass unit,
 wherein the elongated flexible sealing gaskets comprise
  a first flexible sealing gasket comprising an interior, sealed cavity configured to comprise a pressurized fluid, where the first flexible sealing gasket is arranged between a first frame part of the frame arrangement and an outer major surface of the vacuum insulated glass unit, and
  a second flexible sealing gasket comprising an interior, sealed cavity configured to comprise a pressurized fluid, where the second flexible sealing gasket is arranged between a second frame part of the frame arrangement and another opposite outer major surface of the vacuum insulated glass unit.

16. The building aperture cover according to claim 1, wherein the largest total edge deflection of any of the edges of the vacuum insulated glass unit at a temperature difference between the two glass sheets of 65° C. as compared to the vacuum insulated glass unit at a temperature difference of 0° C. is at least 2 mm.

17. The building aperture cover according to claim 1, wherein the largest total edge deflection of any of the edges of the vacuum insulated glass unit at a temperature difference between the two glass sheets of 65° C. as compared to the vacuum insulated glass unit at a temperature difference of 0° C. is at least 0.3% of the length of the deflecting edge.

18. The building aperture cover according to claim 1, wherein the largest total edge deflection of any of the edges of the vacuum insulated glass unit at a temperature difference between the two glass sheets of 40° C. as compared to the vacuum insulated glass unit at a temperature difference of 0° C. is at least 0.15% of the length of the deflecting edge.

19. The building aperture cover according to claim 1, wherein the edges of the vacuum insulated glass unit are configured to deflect when subjected to a temperature difference between the first glass sheet and the second glass sheet, and wherein the flexible sealing gasket is configured to follow the movement of the vacuum insulated glass unit when the edges of the vacuum insulated glass unit deflects due to said temperature difference.

20. A building aperture cover, comprising:
 a frame arrangement;
 a vacuum insulated glass unit arranged in the frame arrangement and comprising an evacuated gap placed between a first and a second glass sheet, and a plurality of support structures are arranged in the evacuated gap;
 elongated flexible sealing gaskets arranged between an outer major surface of the vacuum insulated glass unit and a frame part of the frame arrangement;
 wherein the elongated flexible sealing gaskets are arranged to extend substantially parallel to an edge of the vacuum insulated glass unit,
 wherein the elongated flexible sealing gaskets comprise
  a first flexible sealing gasket comprising an interior, sealed cavity comprising a pressurized fluid, where the first flexible sealing gasket is arranged between a first frame part of the frame arrangement and an outer major surface of the vacuum insulated glass unit, and
  a second flexible sealing gasket comprising an interior, sealed cavity comprising a pressurized fluid, where the second flexible sealing gasket is arranged between a second frame part of the frame arrangement and another opposite outer major surface of the vacuum insulated glass unit, wherein the pressures in the cavities are higher than the ambient air pressure.

* * * * *